United States Patent [19]
Hurlbut et al.

[11] Patent Number: 5,377,227
[45] Date of Patent: Dec. 27, 1994

[54] ADAPTIVE DATA RECOVERY FOR SPREAD SPECTRUM SYSTEMS

[75] Inventors: Amy O. Hurlbut, San Francisco; Philip H. Sutterlin, San Jose, both of Calif.

[73] Assignee: Echelon Corporation, Palo Alto, Calif.

[21] Appl. No.: 178,535

[22] Filed: Jan. 6, 1994

Related U.S. Application Data

[63] Continuation of Ser. No. 942,580, Sep. 9, 1992, Pat. No. 5,289,498.

[51] Int. Cl.⁵ .............................................. H04L 27/30
[52] U.S. Cl. ............................................................ 375/1
[58] Field of Search ................................................ 375/1

[56] References Cited

U.S. PATENT DOCUMENTS

| | | | |
|---|---|---|---|
| 4,112,372 | 9/1978 | Holmes et al. | 375/1 |
| 4,694,467 | 9/1987 | Mui | 375/1 |
| 4,979,183 | 12/1990 | Cowart | 375/1 |
| 5,090,024 | 2/1992 | Vander Mey et al. | 375/1 |
| 5,289,498 | 2/1994 | Hurlbut et al. | 375/1 |

Primary Examiner—Salvatore Cangialosi
Attorney, Agent, or Firm—Blakely, Sokoloff, Taylor & Zafman

[57] ABSTRACT

A method and means for for recovering data in a spread spectrum communications system. The present invention includes a method and means for providing a sync window time period. The sync window is set to encompass the correlation values which are generated one baud time from the previous recovered data bit. The present invention also determines the peak correlation value within the sync window and the location in time within the sync window that the peak correlation value occurs. The present invention also provides a polarity window time period. The polarity window occurs during the sync window. The present invention decodes the data according to the direction of the peak correlation and whether the peak occurred within the polarity window. The sync and polarity windows are then set to occur, such that the peak correlation of the next baud falls within the next instance of the sync window. In this way, data can be recovered continuously.

25 Claims, 14 Drawing Sheets

FIG_1

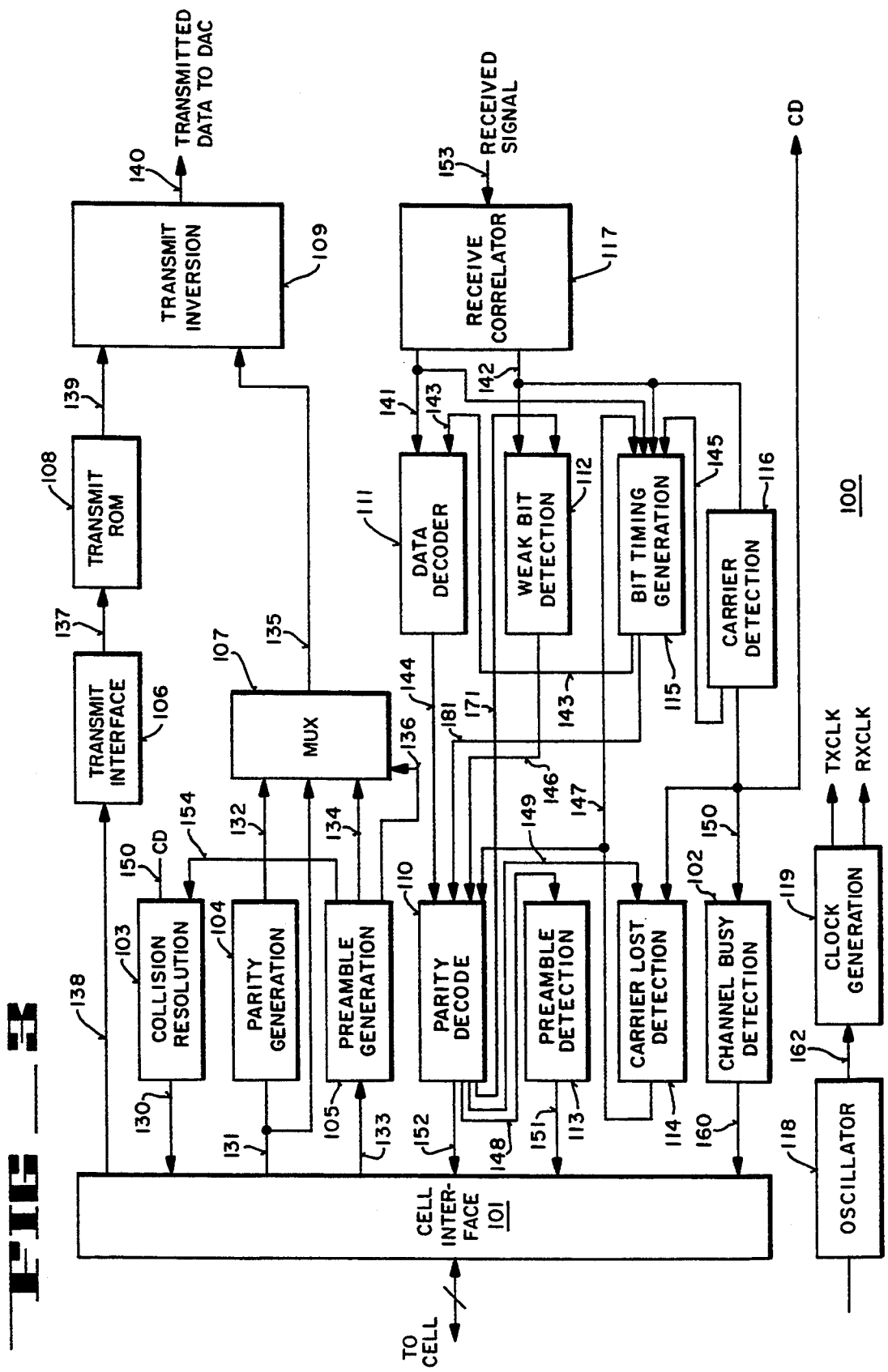

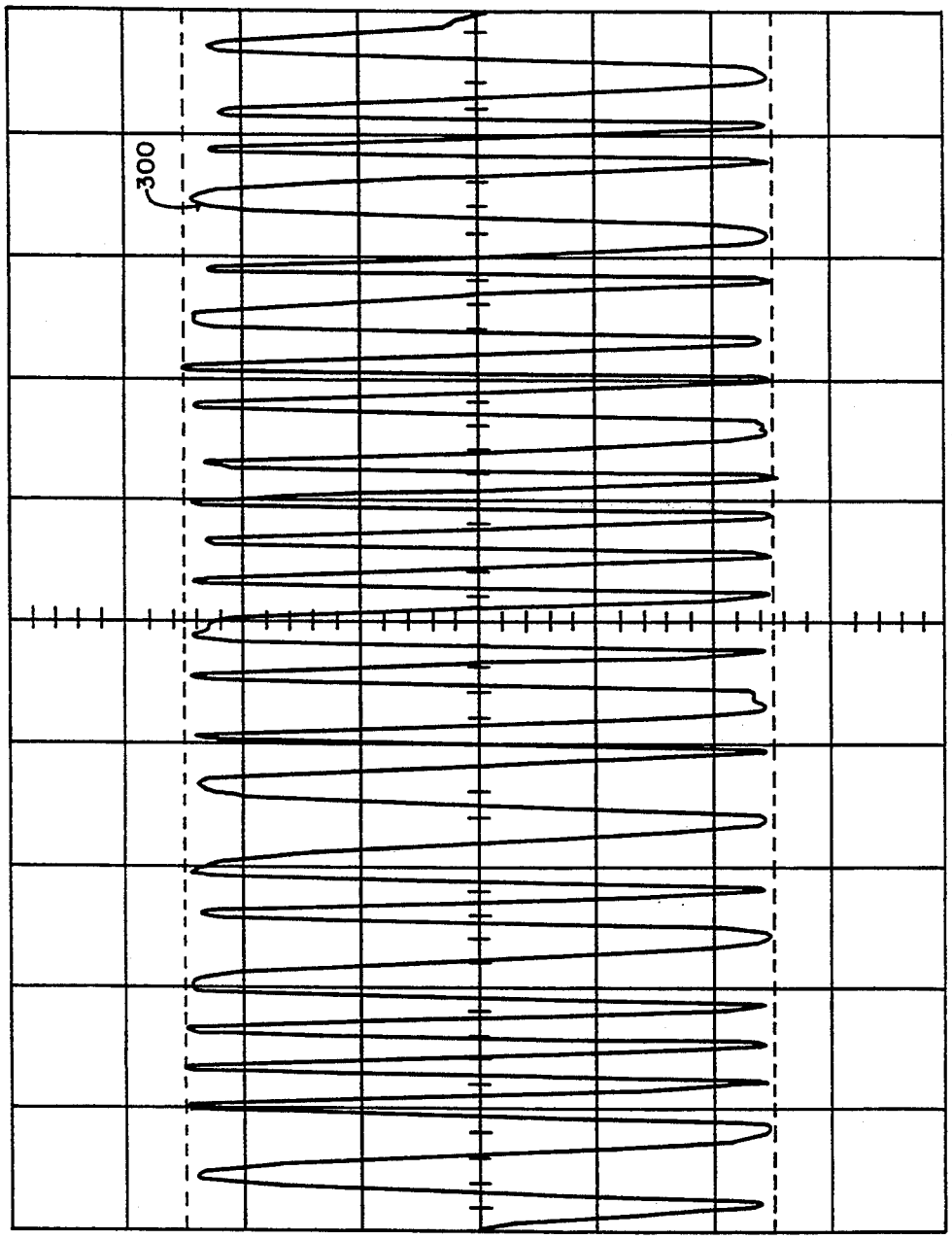
FIG_4

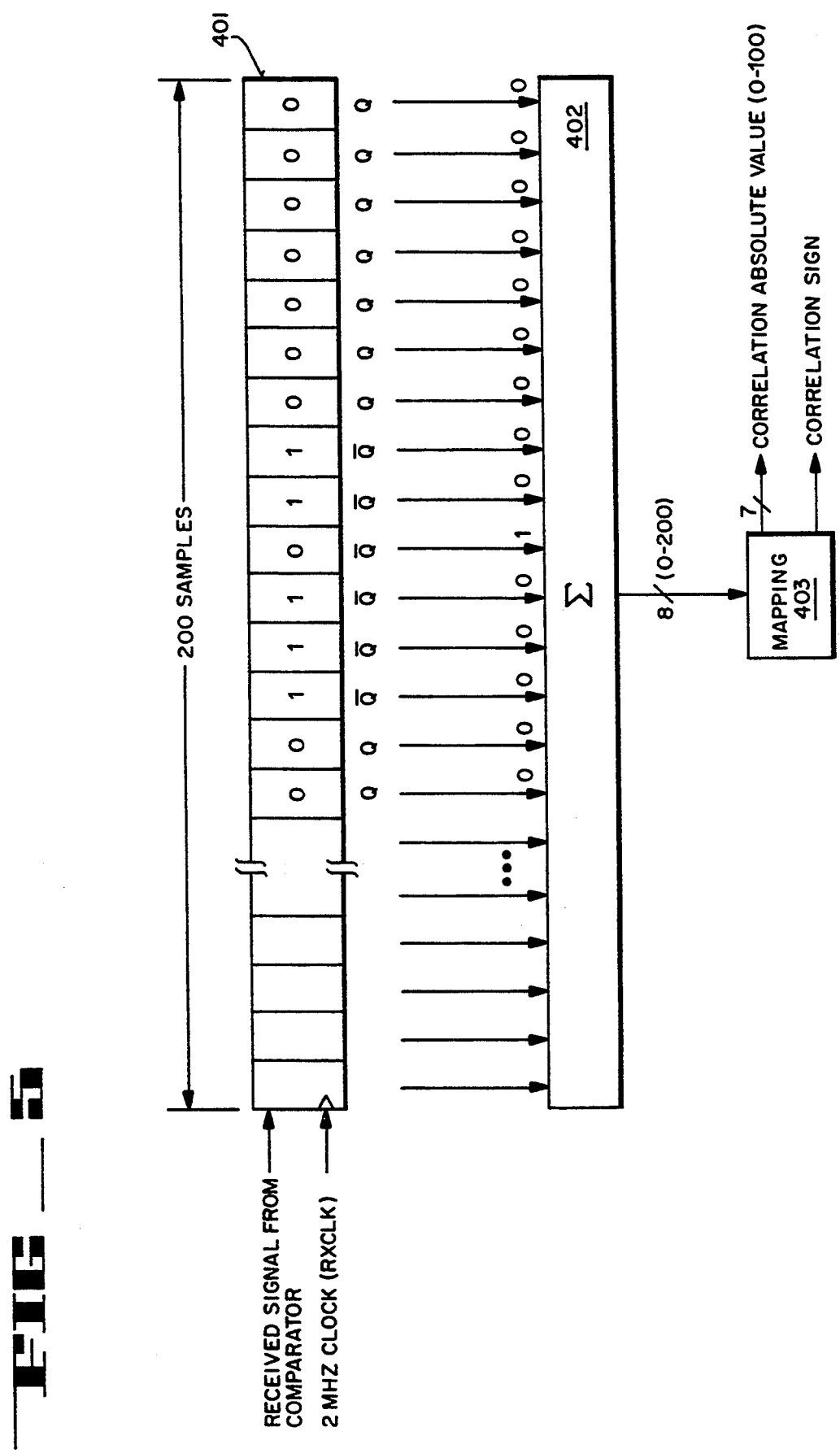
FIG—5

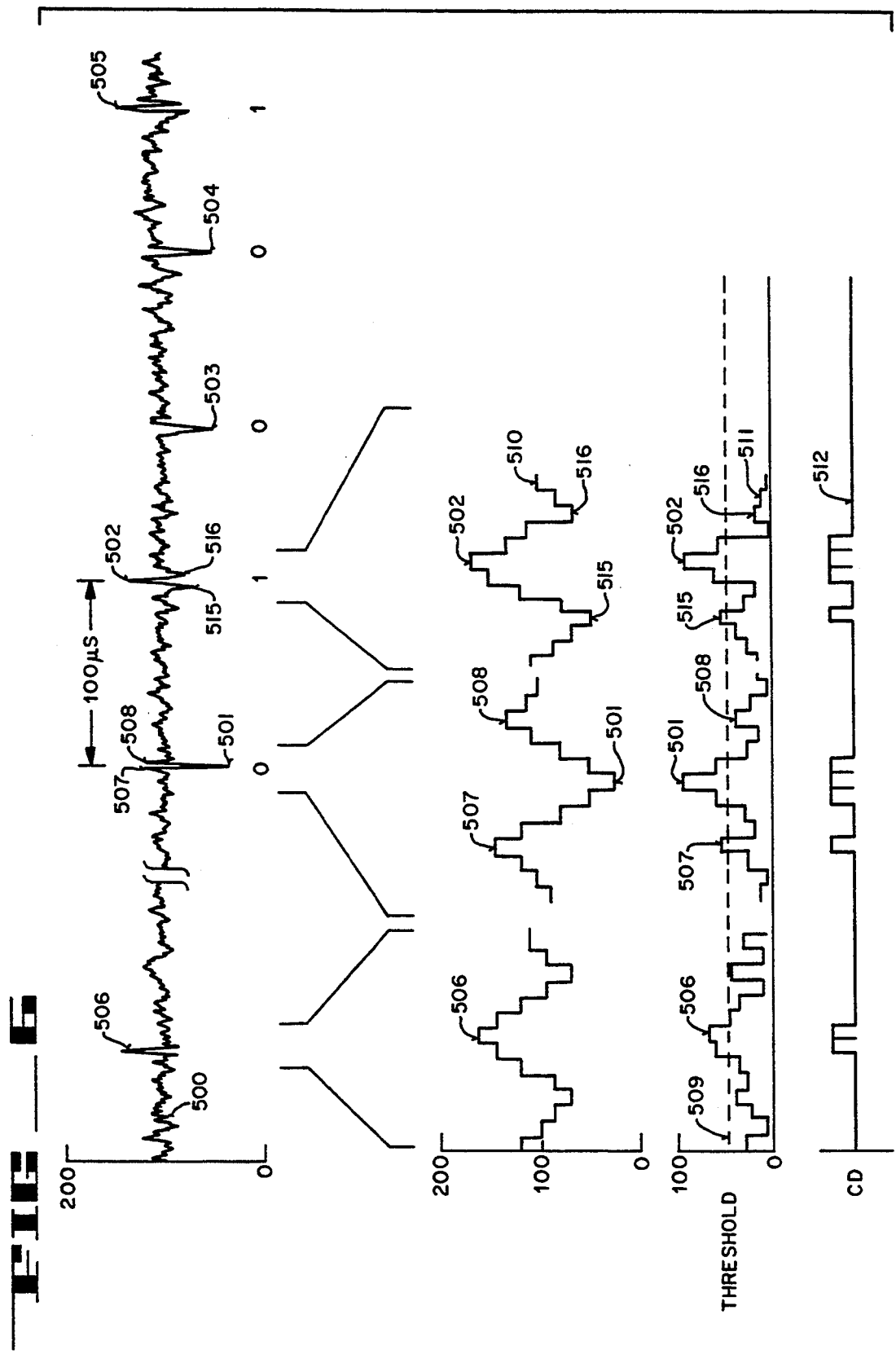

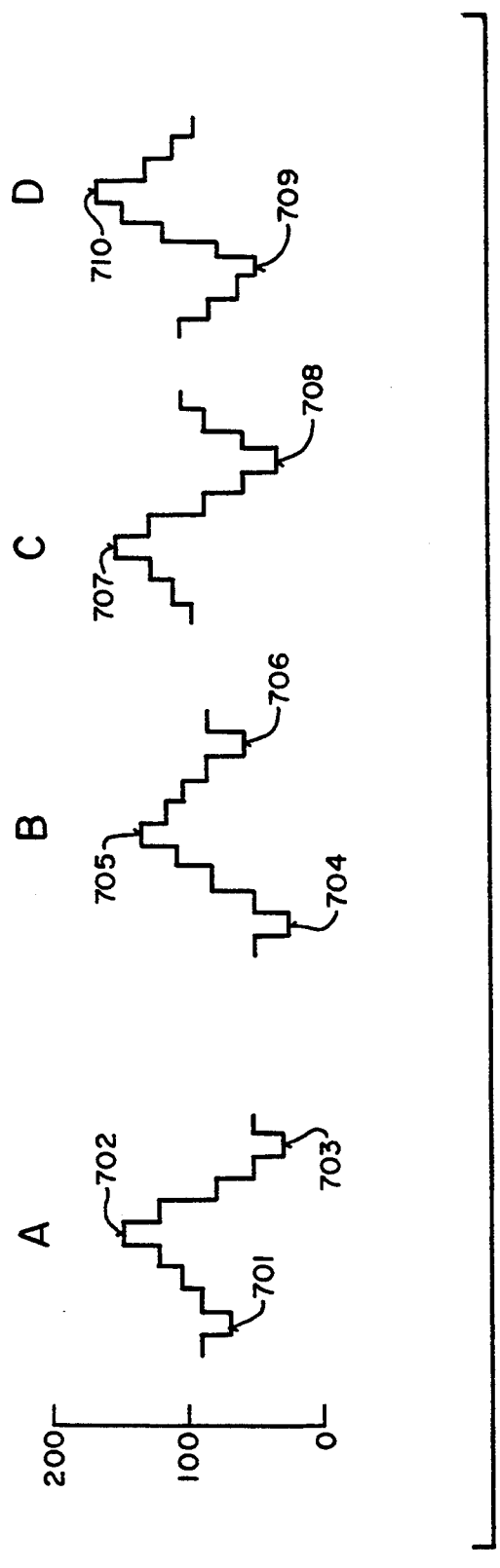

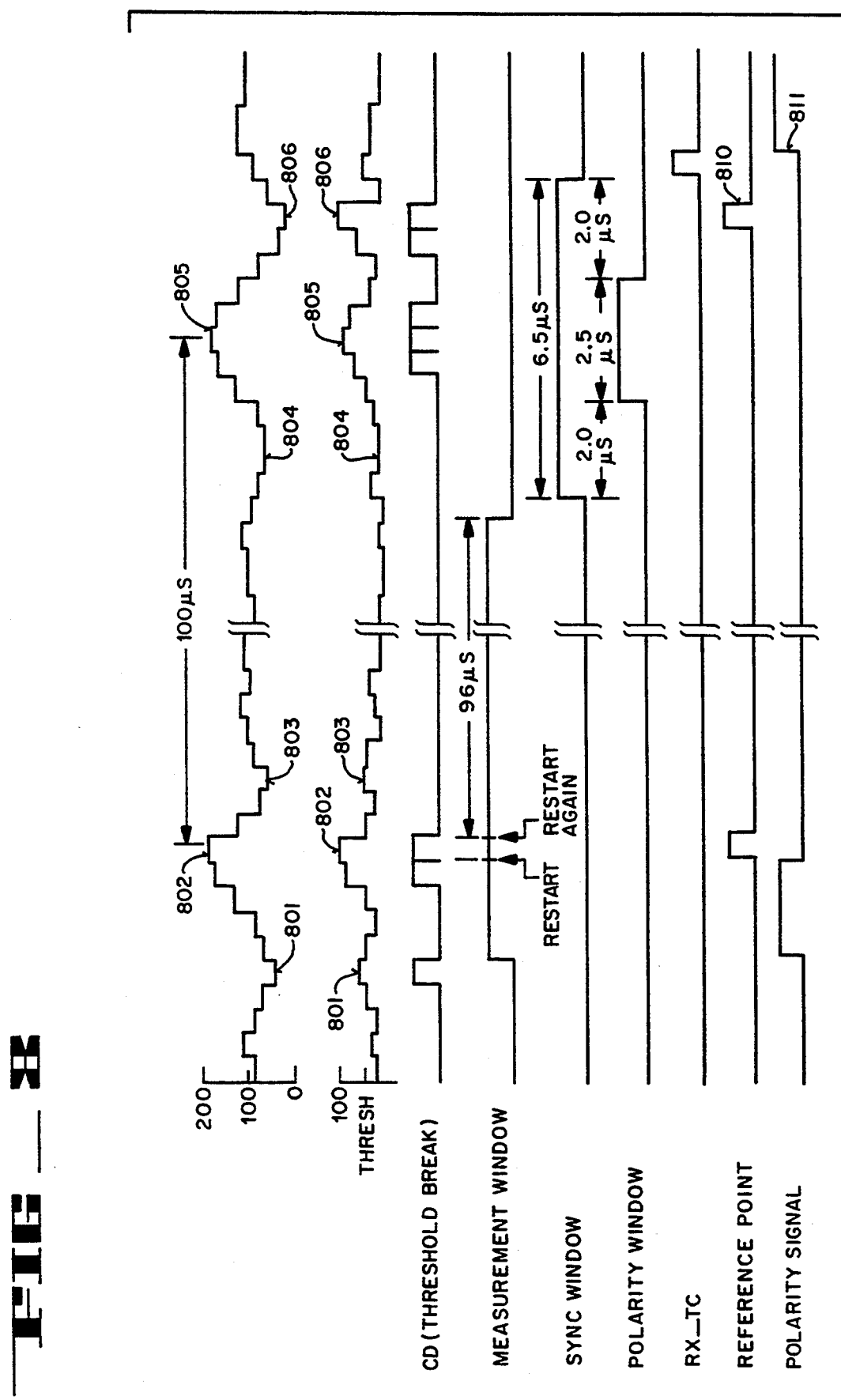

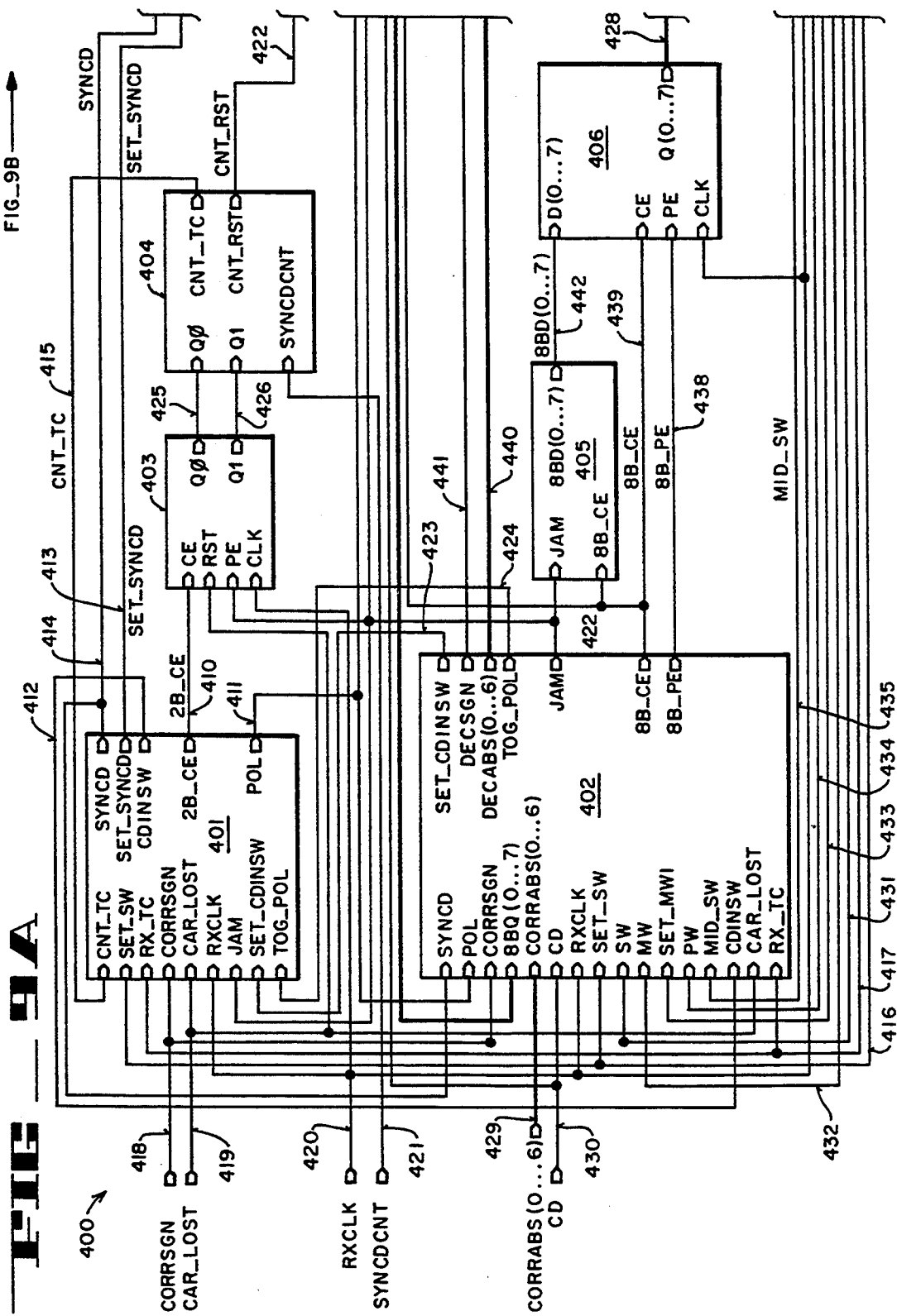

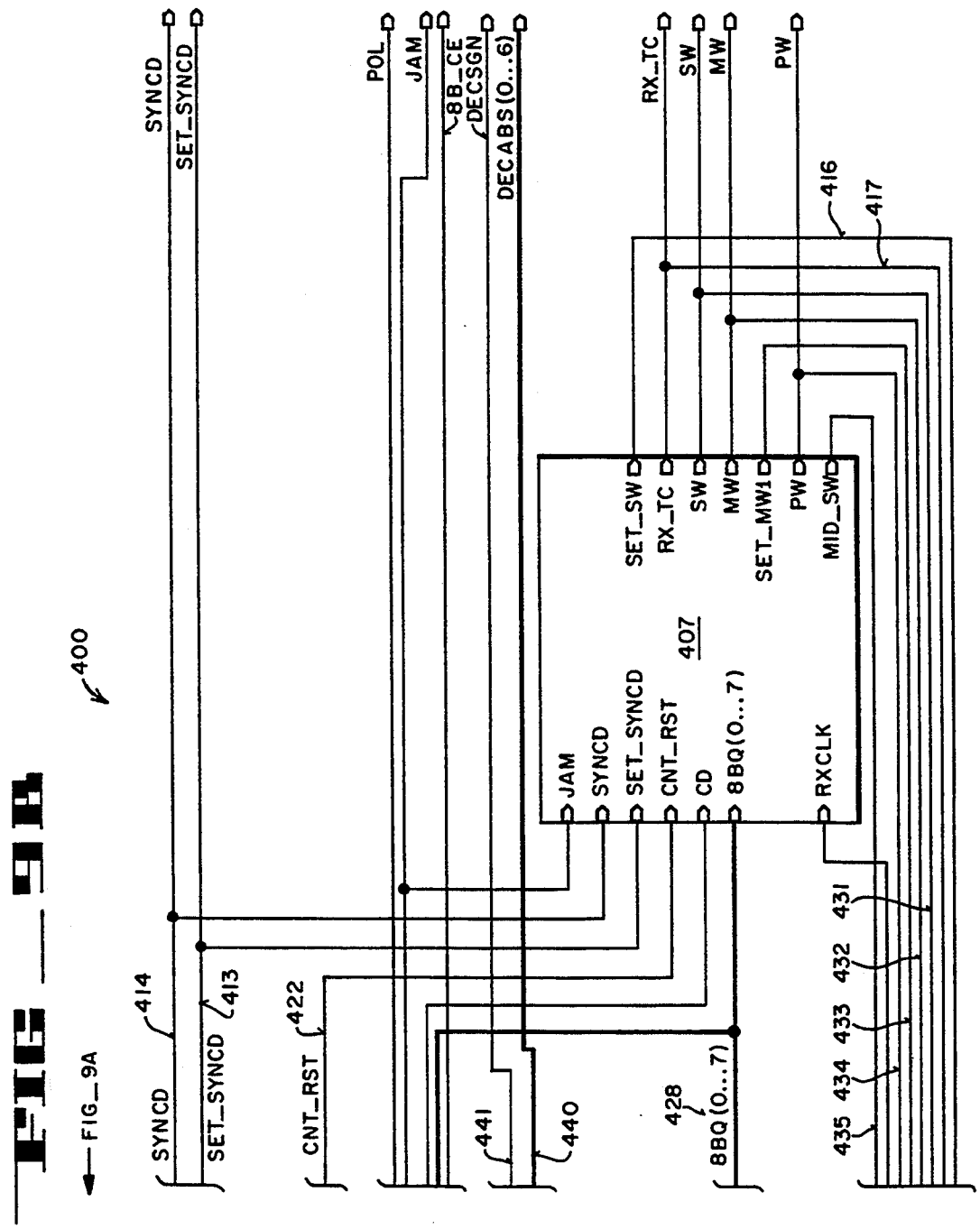

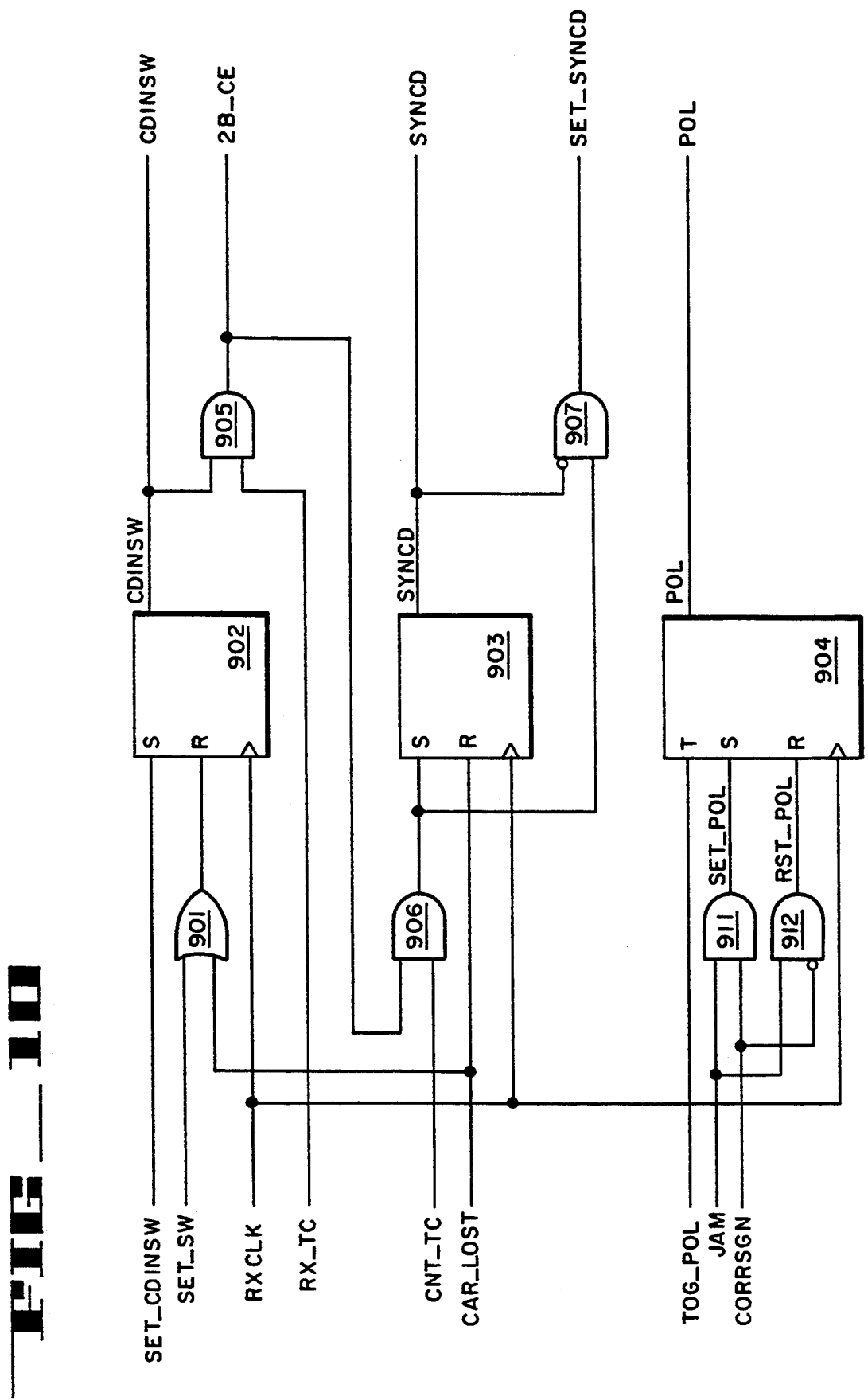
FIG_10

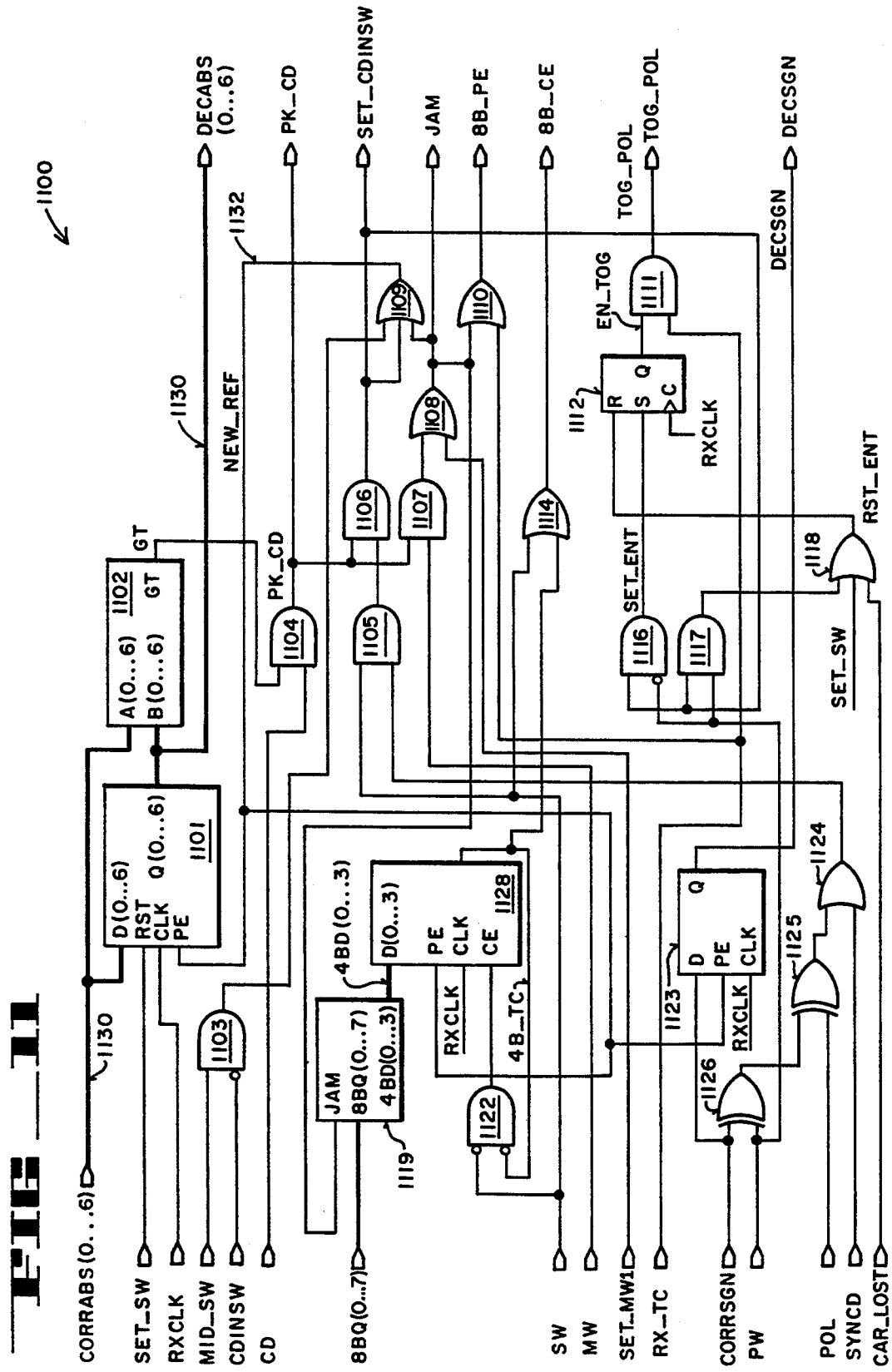

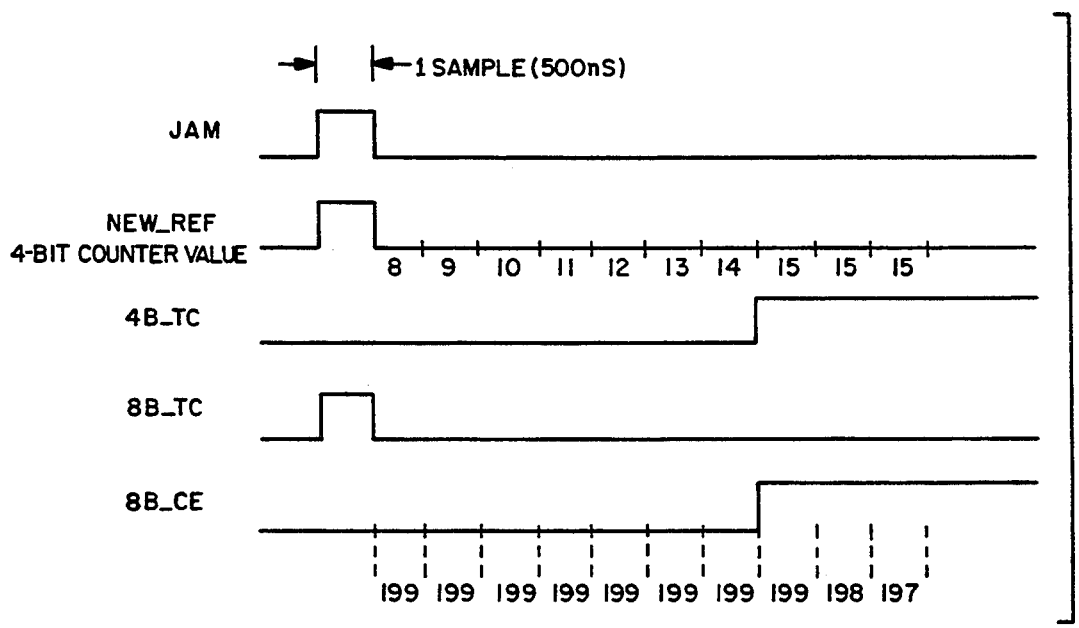
FIG_12A
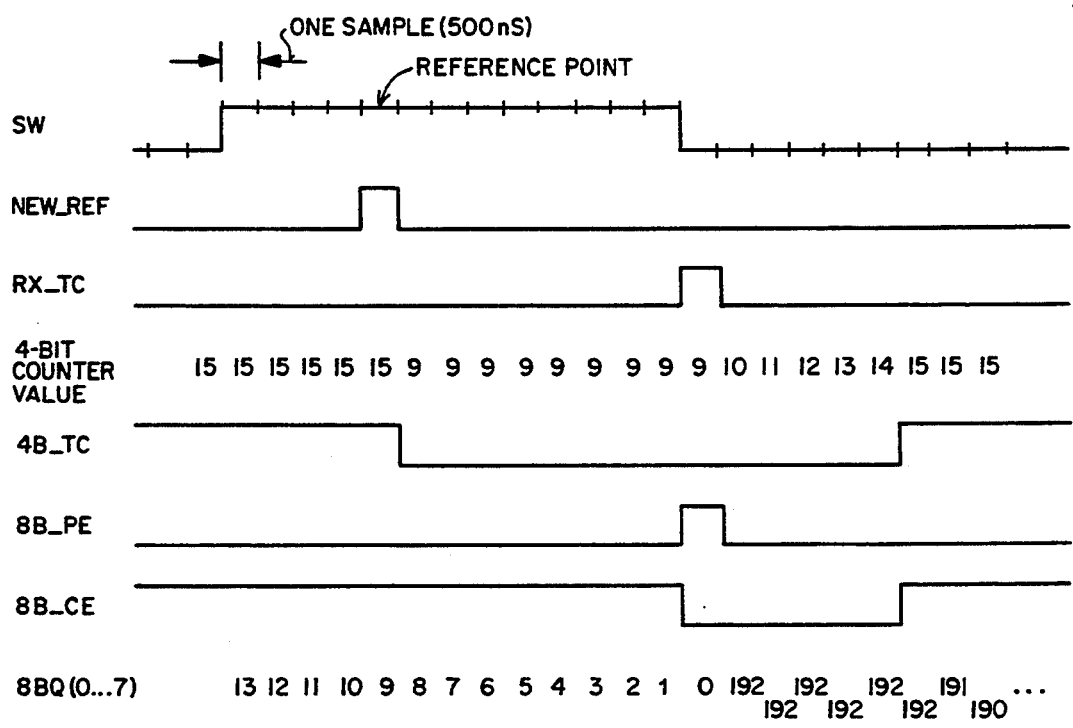
FIG_12B

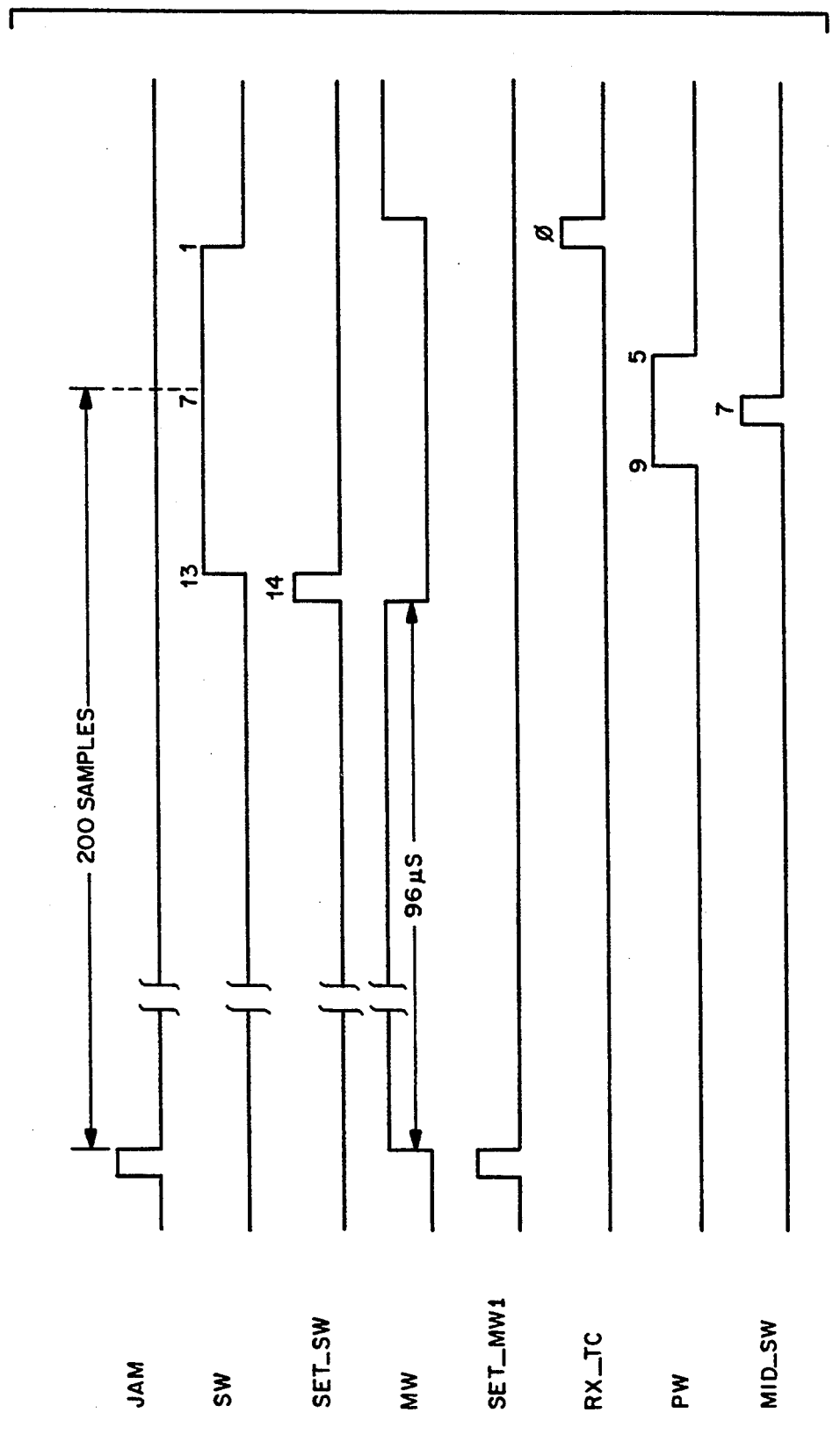

ADAPTIVE DATA RECOVERY FOR SPREAD SPECTRUM SYSTEMS

This is a continuation of application Ser. No. 07/942,580, filed Sep. 9, 1992, now U.S. Pat. No. 5,289,498.

FIELD OF THE INVENTION

The present invention relates to the field of spread spectrum communications systems; particularly, the present invention relates to data recovery in spread spectrum communications systems. BACKGROUND OF THE INVENTION There are a number of commercially available products which provide sensing, control and communications in a network environment. These products range from elaborate systems having a large amount of intelligence to simple systems having little intelligence. By way of example, such a system may provide control between a light switch and a light. When the light switch is operated, a digital code is transmitted by one cell over power lines or free space or other media and is received by another cell at the light. When the code is received, it is interpreted and subsequently used to control the light. Such a system, comprising a network of intelligent cells in which the cells communicate, control and sense information, is described in U.S. Pat. No. 4,918,690, entitled "Network and Intelligent Cell for Providing Sensing, Bidirectional Communications and Control," which is assigned to the assignee of the present invention.

The transmitting and receiving of digital data is normally handled by a series of transceivers. Each of the transceivers is connected to an individual cell in a network. These transceivers may communicate with one another in numerous different ways over various media and at various baud rates. The transceivers may be connected to communications lines, such as an ordinary twisted pair or fiber optic cable. Other known communication media may be employed between the transceivers. One such medium is power distribution lines such as those found in virtually all homes, offices, and factories. In many cases, these power lines distribute 120 volt AC (alternating current) to wall sockets, thereby supplying power to various devices such as appliances, computers, lights, etc. Because power lines are designed primarily for transmitting power, they tend to be far from ideal for communication purposes.

One of the major problems in using power distribution lines for communications is the difficulty in dealing with numerous noise sources and significant signal attenuation which arise in the power line environment. A simplified view of a typical power line environment is shown in FIG. 1. As can be seen in FIG. 1, a house 49 is shown having a number of devices each coupled via a single communications medium which, in this case, is the standard electrical power line that exists in most houses. Power line communication (PLC) apparatus 60 is plugged into one receptacle of wall outlet 52 (alternatively, wall outlet 52 may incorporate the communications intelligence of PLC apparatus 60). Wall outlet 52 is connected by house wiring 53a to a main circuit breaker panel 50 of the dwelling. Other wall outlets, such as outlet 54, are also connected to circuit breaker panel 50 via house wiring 53b in parallel with wall outlet 52. Another PLC apparatus 62 is shown plugged into one receptacle of wall outlet 54 of FIG. 1. Household appliance 56 is coupled in parallel to the same wall outlet 52 as PLC 60. Household appliance 58 is coupled in parallel to the same wall outlet 54 as PLC 62.

The noise on power lines can be quite high due to electrical interference emanating from the very devices being powered. It is well-known that most electronic and electrical products (e.g., household appliances such as household appliances 56 and 58) generate significant electrical noise which is eventually coupled back across the power lines. Signal attenuation on the power line results primarily from the impedance of the power wiring in conjunction with the impedance of various power line loads. Specifically, in the case of house 49, the attenuation from PLC 60 to PLC 62 results from a concatenation of voltage dividers formed by 1) the output impedance of PLC 60 and the parallel impedance of appliance 56; 2) the series impedance in lines 53a and the parallel equivalent impedance of lines 53c including their associated loads; and 3) the series impedance of lines 53b and the parallel impedance of appliance 58. If, continuing the example, outlets 52 and 54 are connected to different power line phases, then there will be additional attenuation due to imperfect signal coupling between power line phases.

Practitioners in the communications art have long recognized that the combination of signal attenuation plus high noise levels poses an especially difficult problem. It is this combination which challenges a power line carrier system in its ability to provide reliable communications.

In the prior art, spread spectrum communications techniques have been utilized in noisy environments, including power lines. Spread spectrum involves transmitting communications signals over a frequency spectrum that is purposely made broad with respect to the information bandwidth. The signals are subsequently despread and decoded at the receiving end. In this manner, spread spectrum receivers have the highly desirable ability to enhance the expected signal while suppressing the effects of all other inputs. One of the drawbacks, however, in using spread spectrum communications is that it often requires elaborate, complex and expensive circuitry. Certain types of spread spectrum systems also suffer from prohibitively long acquisition, synchronization and decoding times.

Many attempts have been made to overcome these shortcomings. One attempt is shown in U.S. Pat. No. 4,979,183. What is needed is a simple spread spectrum communications system which is more reliable for transmitting and receiving data in a network of intelligent cells Which provide sensing, control and communications.

A digital implementation would provide advantages over prior art analog approaches in that certain storage functions are easily implemented. Furthermore, digital implementations are less sensitive to circuit layout. Digital implementations can also be brought to market more rapidly. Finally, digital implementations allow straight forward cost reductions as IC process technology advances.

As will be shown, the present invention provides a simple, low-cost means of providing reliable spread spectrum communication. The present invention employs spread spectrum communication techniques which have a high immunity from interfering signals. Furthermore, the present invention provides a system having an implementation which utilizes an all digital core (only analog input and output interfaces are employed) for providing spread spectrum communications.

SUMMARY OF THE INVENTION

A method and means for recovering data in a spread spectrum communications system is described. The present invention includes a method and means for providing a first time period. The first time period is set to encompass the correlation values which are generated one baud time from the previous recovered data bit. A method and means also determines the peak correlation value within the first time period and the location in time within the first time period that the peak correlation value occurs. The present invention also includes a method and means for providing a second time period. The second time period occurs during the first time period. The present invention also includes a method and means for decoding the data according to the direction of the peak correlation and whether the peak occurred within the second time period. The first and second time periods are then set to occur, such that the peak correlation of the next baud falls within the next instance of the first time period. In this way, data can be recovered.

BRIEF DESCRIPTION OF DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 3 is a block diagram of one embodiment of the transceiver of the present invention.

FIG. 4 illustrates an example spread spectrum characteristic waveform representing one data bit.

FIG. 5 is a block diagram illustrating the receive correlator of the present invention.

FIG. 6 illustrates graphs of example correlation signals.

FIG. 7 illustrates some examples of correlation outputs resulting from distorted received signals.

FIG. 8 is a timing diagram of an example of the bit synchronization and data recovery operation of the present invention.

FIGS. 9A and 9B are a block diagram of the currently preferred embodiment of the bit timing generation block of the present invention.

FIG. 10 is a circuit schematic of the currently preferred embodiment of the control block of the bit timing generation block of the present invention.

FIG. 11 is a circuit schematic of the currently preferred embodiment of the peak detection block of the bit timing generation block of the present invention.

FIGS. 12A and 12B illustrate examples of the operation of the 8-bit down counter of the present invention.

FIG. 13 is a timing diagram depicting the windows generated by the windows block of the currently preferred embodiment of the present invention.

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A transceiver employing spread spectrum communications is described in the following description, for purposes of explanation, numerous specific details are set forth, such as sample rates, transmission rates, correlation values, threshold levels, etc., in order to provide a thorough understanding of the present invention. It will be obvious, however, to one skilled in the art that these specific details need not be used to practice the present invention. In other instances, well-known structures and circuits have not been shown in detail in order to avoid unnecessarily obscuring the present invention.

I. OVERVIEW OF THE COMMUNICATION SYSTEM OF THE PRESENT INVENTION

There are a number of commercially available products which provide sensing, control, and communications in a network environment. These products range from elaborate systems having a large amount of intelligence to more simple and less expensive systems. One example of such a system, comprising a network of intelligent cells in which the cells sense, control, and communicate, is described in U.S. Pat. No. 4,918,690 of Markkula, Jr. et al.

Figure 1:
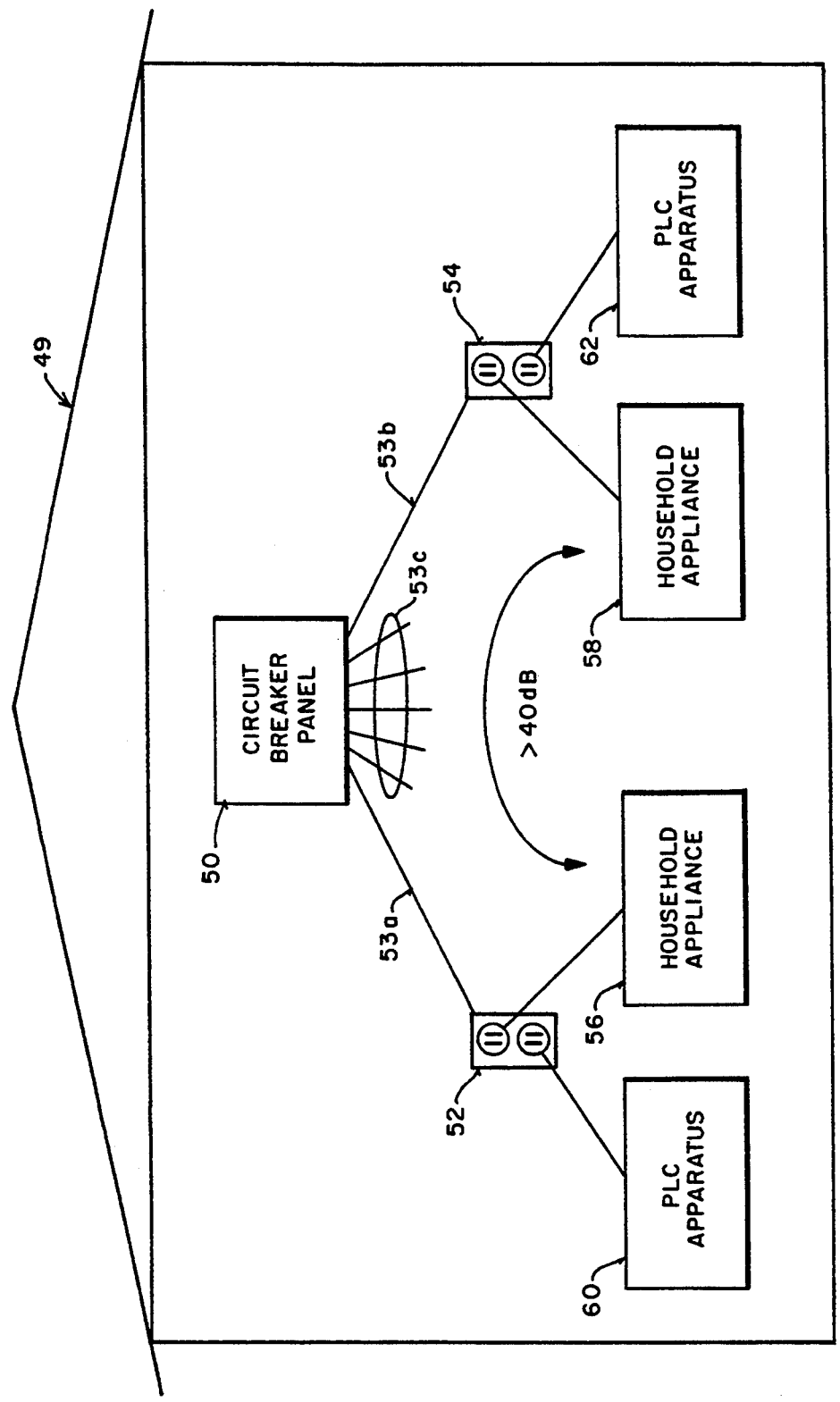
FIG. 1 is a simplified example illustrating the configuration of the power line communication apparatus as used in the present invention.
Figure 2:
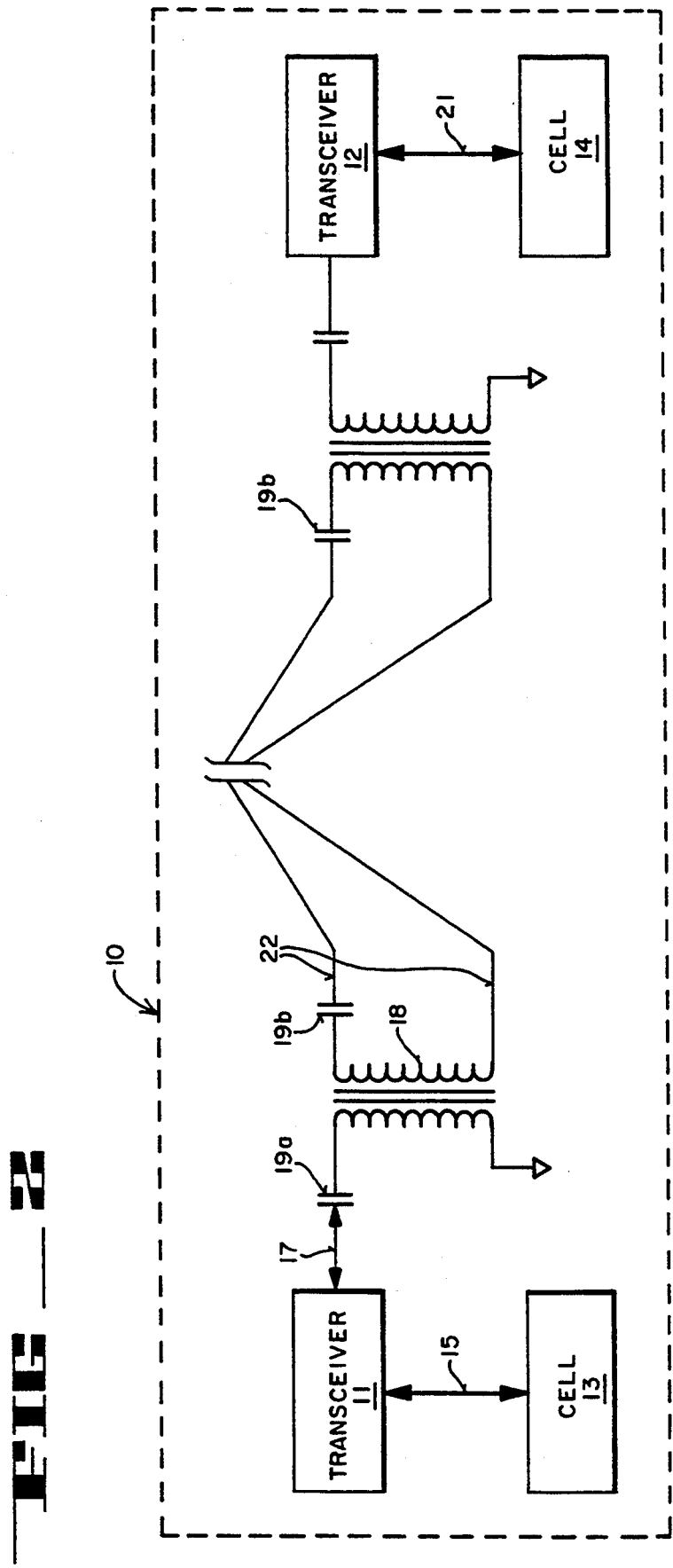
FIG. 2 illustrates a typical communications network which can utilize the present invention.

Referring to FIG. 2, a typical application of the present invention within transceivers 11 and 12 of a communications network 10 is illustrated. Communications network 10 is comprised of a plurality of intelligent cells 13 and 14. In general, cells are programmable semiconductor chips providing remote control sensing and communication functions. When interconnected via transceivers, the collaboration of cells have distributed sensing, communication, control, and configuration capabilities.

Groups of cells within a network perform particular functions. For example, cells 13 and 14 can provide control between a light switch and a light. When the light switch is operated, cell 13 sends a digital code on lines 15 to transceiver 11. When transceiver 11 receives the digital message from cell 13, it transmits the message on line 17 to a coupling network, such as transformer 18 and AC coupling capacitors 19a and 19b. The message is then conducted via medium 22, such as a power line. Once transceiver 12 receives the coded data, it proceeds to decode the received signal and relays the message by way of a digital bit stream on lines 21 to cell 14. Thereupon, cell 14 switches the light on/off.

A. OVERVIEW OF THE TRANSCEIVER OF THE PRESENT INVENTION

FIG. 3 is a block diagram of one embodiment of the transceiver of the present invention. It should be noted that in the following discussion, many of the signals between the components have not been set forth to avoid obscuring the present invention. It should be appreciated that in certain instances other well-known signals are required to perform certain functions.

Referring to FIG. 3, oscillator 118 is coupled to clock generation block 119 via line 162. Clock generation block 119 outputs clock signals TXCLK and RXCLK to the remaining blocks in transceiver 100. Cell interface 101 is coupled to an output from collision resolution block 103 via line 130. Collision resolution block is coupled to carrier detection block via line 150 and to preamble generation block 105 via line 154. Parity generation block 104 is coupled to cell interface 101 via line 131 and multiplexer (MUX) 107 via line 132. Preamble generation block 105 is coupled to cell interface 101 via line 133 and is coupled to MUX 107 via line 134 and lines 136. MUX 107 is coupled to transmit inversion block 109 via lines 135. Transmit inversion block 109 generates an output on lines 140 and is coupled to transmit read-only memory (ROM) 108 via lines 139. Transmit ROM 108 is coupled to transmit interface 106 via lines 137. Transmit interface 106 is coupled to cell interface 101 via line 138. (Line as used in this application may include multiple conductors.)

The received signals from the channel (not shown) are coupled to receive correlator 117 via lines 153. Receive correlator 117 is coupled to data decoder via line 141. Receive correlator 117 is coupled to bit timing generation block 115 via line 141 and lines 142. Receive correlator 117 is also coupled to weak bit detection block 112 and carrier detection block 116 via lines 142. Data decoder 111 is also coupled to bit timing generation block 115 via line 143. Data decoder 111 is coupled to parity decode block 110 via line 144. Weak bit detection block 112 is also coupled to parity decode block 110 via lines 146 and 171. Bit timing generation block 115 is coupled to parity decode block 110 via line 181. Bit timing generation block 115 is also coupled to carrier lost detection block 114 via line 147 and carrier detection block 116 via line 145. Carrier detection block 116 is coupled to channel busy detection block 102, carrier lost detection block 114 and collision resolution block 103 via line 150. Parity decode block 110 is coupled to cell interface 101 via line 152. Parity decode block 110 is coupled to carrier lost detection block 114 via line 149 and preamble detection block 113 via line 148. Preamble detection block 113 is coupled to cell interface 101 via line 151. Channel busy detection block 102 is coupled to cell interface 101 via line 160.

Referring to FIG. 3, oscillator 118 and clock generation block 119 provide clock signals to the components of transceiver 100. In the currently preferred embodiment, oscillator 118 includes a commercial quartz crystal which is not a part of the same integrated circuit as the rest of transceiver 100. The crystal of oscillator 118 resonates at a characteristic frequency, which in the currently preferred embodiment is 10 Megahertz (MHz). The output of oscillator 118 is coupled to clock generation block 119 via line 162. Clock generation block 119, which is included in transceiver 100, receives the clock signal on line 162 and provides an accurate and stable reference frequency to transceiver 100 along lines TXCLK (for transmit) and RXCLK (for receive). In the currently preferred embodiment, the clock signal TXCLK is 5 MHz, while the clock'signal RXCLK is 2 MHz. Clock generation block 119 also generates a clock signal which is sent off-chip for use by other circuits (not shown).

Transceiver 100 includes cell interface 101 which provides an interface between the cell (not shown) and the rest of transceiver 100; it may employ well-known circuits. Cell interface 101 is a two-way interface, such that data flows to and from the cell or chip from and to transceiver 100, respectively. The cell also provides clocking signals to cell interface 101.

Transceiver 100 can be divided into two parts: a transmitter portion and a receiver portion. The transmitter portion consists of the following blocks: collision resolution block 103, parity generation block 104, preamble generation block 105, transmission multiplexor (MUX) 107, transmit interface 106, transmit read-only memory (ROM) 108, transmit inversion block 109, and channel busy detection block 102. In the currently preferred embodiment, each of the blocks in the transmit portion is clocked at 5 MHz. As currently preferred, the receiver portion of transceiver 100 uses parity decode block 110, data decoder 111 weak bit detection block 112, preamble detection block 113, carrier lost detection block 114, bit timing generation block 115, carrier detection block 116 and receive correlator circuit 117. In the currently preferred embodiment, each of the blocks in the receiver portion of transceiver 100 is clocked at 2 MHz.

1. THE TRANSMIT PATH

With respect to a data transfer, the cell makes a request to transmit a packet. The request is fed to and received by cell interface 101. Cell interface 101 decides whether the request can be satisfied by determining if the communications channel is busy. If the channel is determined to be busy, then cell interface 101 responds to the cell by denying its request to transmit. The cell may reissue the request to transmit until cell interface 101 determines that the channel is not busy. Then the request to transmit is accepted by cell interface 101 and the data transfer may begin. In this manner, cell interface 101 performs collision avoidance. A signal on line 160 indicates to cell interface 101 whether the communications channel is busy or idle. The signal on line 160 is generated by channel busy detection block 102 which senses the activity on the channel.

Upon accepting the request to transmit, cell interface 101 signals (on line 133) cause preamble generation block 105 to generate a preamble. The output of preamble generation block 105 is coupled to MUX 107 via line 132. The preamble is a specific set of bits defined by transceiver 100 which is specific to transceiver 100 itself. The preamble is used for collision resolution and synchronization. Well-known technology may be used for this block.

Specifically, the preamble is comprised of three sections: The first portion of the preamble is a collision resolution portion. The collision resolution portion enables the transceivers in the system to determine ownership of the communications channel when two or more transceivers attempt to transmit on the channel at the same time. A signal on line 154, output from preamble generation block 105 and coupled to an input of collision resolution block 103, indicates when the "collision resolution" portion of the preamble is being transmitted. The collision resolution portion of the preamble comprises "talk-then-listen" segments which are programmable. Through cell interface 101, a cell may configure transceiver 100 to any one of 256 talk/listen patterns. In a typical application, these patterns might be randomly chosen for each transceiver connected to the channel. If two transceivers begin transmitting at the same time, the "talk-then-listen" nature of each transceiver is such that one will likely hear the other and stop transmitting so that the other transceiver can continue to transmit without interruption. Collision resolution block 103 generates a signal on line 130 indicating a collision has been detected during transmission. The signal is received by cell interface 101 so that the transmission of transceiver 100 may be aborted as a result of detecting a collision. It should be noted that collision resolution is distinct from collision avoidance where before transmitting, the channel is checked to determine if it is currently being used, and data is either transmitted or not transmitted depending on that determination.

The second portion of the preamble is utilized to establish and qualify bit timing. In one embodiment, the second portion comprises of a series of bits. In the preferred embodiment, this series of bits comprises a series of binary ones. The third, and last portion in the preferred embodiment, is a word synchronization pattern, i.e., the word sync pattern. The word sync pattern allows the receiving transceiver to establish the word timing needed in order to frame the incoming data bytes.

The data to be transmitted is output from cell interface 101 on line 131 to parity generation block 104 and to MUX 107. Parity generation block 104 generates parity bits associated with the transmit data. Parity generation block 104 receives the data from cell interface 101 on line 131. In response to the data, parity generation block 104 generates a predetermined number of parity bits. In the currently preferred embodiment, parity generation block 104 generates one parity bit for every two bytes (16 bits) of data; unless the packet to be transmitted contains an odd number of bytes in which case one parity bit is generated for the last (odd) byte of data. The parity bits are coupled via line 132 to transmission MUX 107.

MUX 107 receives the data bit stream from cell interface 101 on line 131, the preamble bit stream from preamble generation unit 105 on line 134 and the parity bit stream from parity generation block 104 on line 132. MUX 107 multiplexes the three inputs and then outputs a bit stream on line 135 consisting of the preamble, the transmit data and the parity bits in the proper serial order. The multiplexing and transmitting of the data stream output on line 135 from MUX 107 is controlled by signals on lines 136 from preamble generation block 105, in response to signals received by preamble generation block 105 on line 133 from cell interface 101. Thus, in the currently preferred embodiment, a serial data stream is output from MUX 107 comprised of a preamble followed by multiple data words, where each word includes bits of data and one parity bit.

In order to implement a spread spectrum system, each data bit (including preamble and parity bits) corresponds to a characteristic waveform. The characteristic waveform is preselected such that it spreads the energy of one bit of information over the desired frequency range. FIG. 4 illustrates a sample characteristic waveform 300.

ROM 108 stores a digital representation of the characteristic waveform (or coded characteristic waveform) that represents one data bit time. In the currently preferred embodiment, the coded characteristic waveform is stored as 500 bytes of data in ROM 108. Transmit interface 106 addresses ROM 108 so that these 500 bytes are properly outputted from ROM 108 to transmit inversion block 109. In the currently preferred embodiment, transmit interface 106 addresses ROM 108 five hundred times for every data bit time using a nine bit counter. The bytes of ROM 108 are accessed sequentially as the counter decrements from 499 to 0 using a 200 nanosecond period between successive accesses.

The addresses are received from transmit interface 106 on lines 137 according to the counter. In response to the address signals on lines 137, ROM 108 outputs the stored pattern to transmit inversion block 109.

Transmit inversion block 109 receives the coded characteristic waveform from ROM 108 on lines 139 and the data bit stream on line 135. For each data bit, the coded characteristic waveform, or its inverse, is clocked out of transmit inversion block 109 on lines 140. For each data bit which is a "1", the coded characteristic waveform is clocked out unmodified. For each data bit which is a "0", the coded characteristic waveform is inverted. In other words, the output from transmit inversion block 109 is a series of coded characteristic waveforms or inverted coded characteristic waveforms as defined by the serial data stream from MUX 107. In one embodiment, transmit inversion block 109 uses exclusive-OR gates to invert the waveform. The series of coded characteristic waveforms is output from transmit inversion block 109 on lines 140.

The output signals from transmit inversion block 109 are outputted from transceiver 100. These signals are inputted to a digital-to-analog converter (DAC) which converts the signals on lines 140 into an analog representation of the characteristic waveform 300. In one embodiment, the analog representation is then amplified. After amplification, interface circuitry couples the signals to the communications channel (e.g., an electric power line) and the signals are transmitted throughout the network. In the preferred embodiment, the data is transmitted at 10 kilobits per second (KBPS), which is equivalent to transmitting one bit every 100 microseconds.

2. THE RECEIVE PATH

When receiving, the data being transmitted on the channel (not shown) is coupled from the power line by the use of a coupling interface (not shown). One of the coupling interface's primary functions is to separate the high frequency communication signals from the lower frequency (e.g., 60 Hz) power distribution signals. The received high frequency signals are then processed through a front-end circuit which filters and amplifies them. In addition, just prior to transceiver 100, the signals are quantized in amplitude. In its simplest, and currently preferred embodiment, amplitude quantization involves slicing the filtered and amplified receive signal about its midpoint, thus creating a two-level quantizated signal. A single comparator provides this simple quantization function. If the data signal is above the midpoint, a high signal is outputted by the comparator. Otherwise, the comparator outputs a low signal. Ideally, given no distortion of the signal, the output of the comparator would resemble a squared-up version of the transmitted characteristic waveform.

The processed signal from the comparator is inputted to correlator 117 of transceiver 100. Correlator 117 correlates a receive signal with a representation of the expected receive waveform. In theory, received signals would have 100% correlation and noise would have 0% correlation. In practice, a received signal will have been attenuated, distorted and subjected to additive noise, thus reducing its correlation to the expected receive waveform.

FIG. 5 is a block diagram illustrating one embodiment of the receive correlator of the present invention. The receive correlator is comprised of shift register 401, a summer 402, and a mapping block 403. In the currently preferred embodiment of the present invention, the transmission rate on the power line is 10K bits per second resulting in a 100 μs data bit period. The transmit waveform is spread across a spectrum of approximately 100K to 450 KHz. Although, according to the Nyquist theorem, the transmit waveform can be sampled at twice its frequency without losing any information, a sampling rate of approximately 4:1 is implemented in the present invention to provide greater resolution. Hence, the received signal is sampled at 2.0 MHz (i.e., over four times the highest frequency of the waveform). Given a 2.0 MHz sampling rate and a data bit period of 100 μs, shift register 401 is made 200 bits long in order to hold one data bit of information. The significance of shifting in one data bit of information is to permit each data bit's waveform to be compared against a stored expected receive waveform. This comparison is known as a correlation.

Consequently, the contents of shift register 401 are a quantized version of the signal that was on the power line for the past 100 μs (i.e., one bit time). A new picture of the signal on the power line in the past 100 μs is shifted into shift register 401 every 500 nsec. For each shift, a correlation is performed on the sampled signal to determine its correlation value. The correlation value is subsequently used to determine whether the signal on the power line is a transmitted characteristic waveform or whether it is noise.

In the currently preferred embodiment, the sampled signal in shift register 401 is compared against the expected receive waveform (reference pattern) by taking either the Q or $\bar{Q}$ output from shift register 401. This reference pattern determines which of the two outputs, Q or $\bar{Q}$, is to be taken. For example, if fifteen consecutive bits of the 200 bit reference pattern are 001111110000000, the corresponding shift register 401 outputs would be Q, Q, $\bar{Q}$, $\bar{Q}$, $\bar{Q}$, $\bar{Q}$, $\bar{Q}$, $\bar{Q}$, Q, Q, Q, Q, Q, Q, Q. A Q output corresponds to the current value of that particular sample bit in the shift register, whereas a $\bar{Q}$ output corresponds to the inverse of that particular sample bit in the shift register. In other words, if the sampled bit matches the reference bit, shift register 401 outputs a 0 for that shift register location. Otherwise, a 1 is outputted. Continuing the example, if 15 sampled bits of the shift register are 001110110000000 and the corresponding reference pattern is 001111110000000, there would be one mismatch. This level of matching (or correlation) would appear as 14 zeros and 1 one out of shift register 401, as illustrated in FIG. 5.

The 200 outputs from shift register 401 are fed into summer 402, which counts the number of 1's. The output from summer 402 can range from (0–200, where 0 corresponds to a perfect match and 200 corresponds to a perfect mismatch. Note that both total mismatches and total matches correspond to valid data bits, given that either the characteristic waveform or its inverse is being transmitted, depending on whether the data bit is a 1 or a 0, respectively. Since in the currently preferred embodiment, the reference pattern is defined by the inverse of the characteristic waveform, a perfect match indicates that a bit transmitted with the inverse waveform was received. This results in 0 at the output of summer 402.

The output of summer 402 is inputted to mapping circuitry 403 which converts it into a correlation absolute value and sign indication. The absolute value of the correlation is determined by subtracting 100 from the output of the summer and then taking its absolute value. In the currently preferred embodiment, the result is a 7-bit signal ranging from 0 to 100, where 0 corresponds to no correlation (e.g., noise) and 100 corresponds to 100% correlation (e.g., an ideal receive data bit). Hence, a high absolute correlation value indicates that there is probably valid data on the power line, and a low absolute correlation indicates that there is probably noise on the power line. In the currently preferred embodiment, mapping circuit 403 also outputs a single sign bit based on the sign of the result after 100 had been subtracted. The sign bit is used to decode the data.

Once the absolute value and the sign have been generated, the absolute value and sign bit are outputted from receive correlator circuit 117 on lines 142 and line 141 respectively, and the data is decoded. To produce the decoded data, the sign bit, which indicates the direction of the correlation, is convened into a processed data stream. In the currently preferred embodiment, if the sign bit is a 0, it indicates that there was a positive correlation, while if the sign bit is a 1, then a negative (or inverse) correlation occurred. By looking at the proper point in time (as determined by bit timing generation block 115), whether the sign bit is a 1 or 0, the data can be decoded. Data decoder 111 receives the sign bit on line 141. Data decoder 111 also receives an output from bit timing generation block 115 on line 143, which indicates the proper time to examine the sign bit for data decoding.

Bit timing generation block 115 provides timing for decoding the output of receive correlator circuit 117. The data is decoded by data decoder 111 in response to a signal on line 143 from bit timing generation block 115. In the currently preferred embodiment, the signal is active for one sample (i.e., 500 ns) every 100 microseconds and indicates to data decoder 111 when the sign bit from receive correlator circuit 117 should be examined. In other words, when the signal on line 143 is active, data decoder 111 examines the sign bit on line 141 and generates decoded data accordingly. Bit timing generation block 115 begins providing timing signals on line 143 in response to a signal on line 145 from carrier detection block 116, indicating that there has been a carder detection.

Carder detection block 116 receives the absolute values of the correlation on lines 142 from receive correlator circuit 117 and determines whether or not characteristic transmit waveforms are present on the channel. Threshold levels (i.e., specific correlation values) are set up to determine whether a strong enough correlation occurred indicating carrier detection. When the absolute value of the correlation exceeds the threshold level, a threshold break is said to have occurred. If a threshold break occurs, there is carrier detection. When carrier detection occurs, carrier detection block 116 outputs a carder detection signal on line 150. Detailed operation of the carrier detection block is covered in copending application, Ser. No. 07/942,646, filed Sep. 9, 1992, entitled "Adaptive Threshold in a Spread Spectrum Communications System", which is assigned to the assignee of the present invention, now U.S. Pat. No. 5,263,050.

Once the data has been processed by data decoder 111, the stream of processed data is outputted on line 144. Parity decode block 110 receives the output of data decoder 111 on line 144. Parity decode block 110 then performs the parity check on the data. If the parity is good, then parity decode block 110 outputs the received data to cell interface 101 on line 152. If the parity is bad, parity decode block 110 signals weak bit detection block 112 on line 171. In response, weak bit detection block 112 indicates which of the bits currently being examined had the weakest correlation value. Weak bit detection block 112 determines which of the bits had the weakest correlation value by examining the absolute Values (i.e., magnitudes) of the correlations received on lines 142 from receive correlator 117. Weak bit detection block 112 notifies parity decode block 110 of the bit with the weakest correlation via lines 146. Parity decode block 110, in response to this signal, inverts the bit having the weakest correlation if the parity is bad. Weak bit detection and error correction are described in co-pending application, Ser. No. 07/942,723, filed Sep. 9, 1992, entitled "Error Correction in a Spread Spectrum Transceiver," which is assigned to the assignee of the present invention. The decoded, corrected data is then sent to the cell via cell interface 101.

Preamble detection block 113 receives an output from parity decode block 110 on line 148. Preamble detection block 113 performs preamble detection in response to its input on line 148. Preamble detection block 113 provides the cell, via cell interface 101, with an end of preamble/beginning of data indication on lines 151. With this information, the cell is able to extract the data information from the stream of data being received from cell interface 101.

Carrier lost detection block 114 receives the carrier detection signal on line 150 from carrier detection block 116 and determines when the carder is no longer present. In the currently preferred embodiment, the packets of data do not contain an end of packet code to indicate the end of the packet. Therefore, in the present invention, to determine if the carrier is lost, carrier lost detection block 114 examines the carrier detection signal on line 150 to determine whether during a specific number of predetermined time intervals there were no threshold breaks. If there were no threshold breaks occurring within the specific number of predetermined time intervals then, carrier lost detection block 114 determines that the carder is lost. In the currently preferred embodiment, if after a byte of information has been received where there are no threshold breaks within the predetermined time intervals, then carrier lost detection block 114 determines that the packet had ended. Carrier lost detection block 114 indicates that the carrier has been lost by outputting a carrier lost signal on line 147 which is received by bit timing generation block 115, therein causing bit timing generation block 115 to stop generating its bit timing signal on line 143 to data decoder 111. The carrier lost signal on line 147 is also sent to parity decode block 110. In the currently preferred embodiment, in response to the carrier lost signal on line 147, parity decode block 110 discards the last byte of data received from data decoder 111.

A more detailed explanation of the operation of the receive path of transceiver 100 is given below.

B. ADAPTIVE DATA RECOVERY

1. Characteristics of the Correlation Waveform

FIG. 6 is a graph illustrating a typical correlation output. Given an input data stream of 01001 with each data bit time being 100 μs, the correlator samples the received signal every 500 ns. This input signal is correlated with the reference pattern every 500 ns. The upper-most signal illustrates a typical output 500 from the summer of the receive correlator, showing also a period of time prior to the arrival of the input data stream. Note that due to the properties inherent to the transmitted waveform for each valid data bit, there is a center lobe and a pair of side lobes. For example, side lobes 507 and 508 straddle center lobe 501. In the currently preferred embodiment, the characteristics of the transmit waveform are such that side lobes occur approximately four samples on either side of a center lobe. Thus, in FIG. 6, each valid data bit is represented by a triplet of peak correlation values, wherein 0's have downward center lobes and 1's have upward center lobes (501–505). Note that when no valid receive signal is present, the residual noise might occasionally have a relatively high correlation, such as lobe 506.

The second graph of FIG. 6 illustrates a more detailed depiction (expanded in time view) of the correlation peak 506, resulting from noise, and the correlation triplets of the first two data bits of output signal 500. Each division, or flat portion, represents one sample (500 nanoseconds) time interval. Peaks 501 and 502 correspond to data bits 0 and 1, respectively. The side lobes of peak 501 are peaks 507 and 508, while the side lobes of peak 502 are peaks 515 and 516. Peaks 501, 507 arid 508 form a triplet, as do peaks 502, 515 and 516. Multiple correlation peaks for each data bit are characteristic of the currently preferred embodiment. Unimpaired (or slightly impaired) receive signals from the spread spectrum system of the present invention produce these correlation triplets. When real world impairments are added, the correlation peaks corresponding to the side lobes can be either smaller or larger than the center lobe. In fact, FIG. 7 illustrates examples of correlation peaks from typical impaired receive signals. Referring to FIG. 7, four types of correlations are shown, as A, B, C and D. The first, A, shows the correlations of a distorted triplet, having peaks 701–703. Peak 703 is the peak corresponding to the trailing side lobe and is shown with the absolute value of its correlation being larger than that of the peak 702 corresponding to the center lobe. The second example, B, shows the correlations of a distorted triplet, having peaks 704–706. Peak 704 is the peak corresponding to the leading side lobe and is shown with the absolute value of its correlation being larger than that of the peak 705 corresponding to the center lobe. The third example, C, shows a correlation of a distorted signal producing only two significant correlation peaks, 707 and 708. In this example, peak 708 corresponds to a side lobe and has a larger absolute value than that of peak 707 which corresponds to the center lobe. The fourth example, D, shows a correlation of a distorted signal again producing only two correlation peaks, 709 and 710. Peak 709 corresponds to a side lobe and has a larger absolute value than that of peak 710 which corresponds to the center lobe. Note that the present invention has the ability to synchronize on and correctly recover the data from any of these distorted correlation waveforms.

Since it is possible that impairments could make one of the side lobes (or peaks) produce a higher correlation value than the center lobe, the correlation associated with a side lobe might be mistaken for the center lobe correlation. Because the side lobes have an opposite correlation sign, eventual decoding of the data using the side lobes could result in inverted data bits if prior art decoding techniques were employed. Moreover, the influence of noise on the center and side lobes can change with time. As will be described, the present invention deals with these and other difficulties so as to properly synchronize on and correctly recover data from incoming packets.

2. CARRIER DETECTION AND BIT SYNCHRONIZATION

Referring back to FIG. 6, the third graph illustrates the correlator's absolute value output, from the mapping circuit of the receive correlator, is illustrated as signal 511. Again, peaks 501 and 502 correspond to data bits. A threshold level 509 is set to differentiate between noise and a valid incoming packet of data bits. Correlations above threshold 509 trigger a carrier detect indication and are interpreted as an indication of a probable incoming data packet. A threshold break is considered to occur when the absolute value of a correlation produced by the receive correlator circuit of the transceiver is greater than a predetermined threshold value. Note that occasionally noise, such as the noise which produced correlation peak 506, can break threshold 509. Such instances are called false carrier detects.

Also note that the threshold values are determined according to the system and condition of the communications channel. In the currently preferred embodiment, the threshold values are adaptive. The adaptive nature of the threshold values is described in co-pending application, Ser. No. 07/942,646, filed on Sep. 9, 1992, entitled "Adaptive Threshold in a Spread Spectrum Communications System", which is assigned to the assignee of the present invention, now U.S. Pat. No. 5,263,050.

The fourth, and bottom, graph in FIG. 6 illustrates a carder detect CD signal 512 which is high during each sample which breaks threshold.

The present invention establishes bit synchronization using threshold breaks. In the currently preferred embodiment, transceiver 100 achieves bit synchronization as a result of the receipt of one correlation breaking threshold. The occurrence of a threshold break plus the knowledge of the time interval between bits allows for the bit timing to be generated. Thus, bit synchronization is established after only one bit is received. After a correlation breaks threshold, bit timing generation block 115 begins generating its bit timing signal on line 143 for every bit time.

3. ESTABLISHING PACKET SYNCHRONIZATION

Part of the preamble of an incoming packet is used to qualify the bit timing and achieve "packet synchronization". Transceiver 100 achieves packet synchronization (sync) when multiple threshold breaks occur with proper timing and direction during the preamble portion of the packet. The number of threshold breaks required to obtain packet sync is configurable. In the currently preferred embodiment, packet sync is obtained when an initial, or first, threshold break and either one or two confirming threshold breaks occur, with proper timing and direction during the preamble portion of the bit stream. Furthermore, by obtaining correlations on the preamble portion of the bit stream, bit synchronization can be verified, after which transceiver 100 can achieve synchronization on the packet's words (i.e., word synchronization or word sync can be obtained).

Transceiver 100 begins attempting to establish packet sync when the first threshold break occurs. The sample at which the threshold break occurs is considered the reference point. The direction of this correlation which breaks threshold is recorded and determines the initial polarity convention for receiving the remainder of the packet.

Initially after a threshold break occurs, a measurement window (i.e., a time period) is set up. The measurement window is set up by bit timing generation block 115. The measurement window lasts for a period of time slightly less than one bit time. In the currently preferred embodiment, where the bit time is 100 microseconds, the measurement window is 96 microseconds. During that measurement window, the correlation values are examined to determine if any threshold breaks occur which have a greater absolute value than the one which corresponds to the reference point (i.e., the start of the measurement window). If at any time during this measurement period, any correlation value occurs which has an absolute value which is greater than that of the reference point, the measurement window is reset. The measurement is reset to begin from the point in time that the sample having the greater correlation value occurred. The purpose to restarting the measurement window is to allow synchronization to be obtained on the packet even if the threshold break which initially caused the measurement window to be set up was due to noise. When the measurement window is restarted, the reference point is reset to be the sample corresponding to the greater correlation value and the direction of this correlation now determines the initial polarity convention for receiving the remainder of the packet. If threshold breaks occur during the measurement window that are not greater than the correlation value of the reference point, these threshold breaks are ignored.

FIG. 8 depicts two data triplets, including their associated threshold breaks. Referring to FIG. 8, one correlation triplet is comprised of peaks 801-803, where peak 802 corresponds to the center lobe and peaks 801 and 803 correspond to the side lobes on either side of the center lobe. The other data triplet is shown as being comprised of peaks 804-806, where peak 805 corresponds to the center lobe and peaks 804 and 806 correspond to the side lobes on each side of the center lobe. When the first threshold break occurs, which corresponds to the first side lobe, the measurement window begins as shown in the measurement window diagram. Furthermore, the polarity convention is recorded by setting the polarity signal, indicating that the correlation was in the downward direction. Upon the occurrence of the first threshold break of the center lobe 802, the measurement window is restarted, since its magnitude is greater than the correlation value of side lobe 801, and the polarity convention signal is reset, indicating that the correlation was in the upward direction. The measurement window is again restarted upon the occurrence of the second threshold break of the center lobe 802, and the polarity convention signal remains reset.

Once the measurement window has expired, (i.,e., timed out) without any increase in the intermediate threshold breaks, two additional windows (i.e., time periods) are set up: the synchronization (sync) window and the polarity window. The sync window consists of a time period that is wide enough to encompass all three lobes and is centered one bit time from the reference point. In the currently preferred embodiment, the sync window is thirteen samples wide, 500 nanoseconds per sample, such that the window comprises 6.5 microseconds of time. In one embodiment, the sync window begins upon the expiration of the measurement window. In the currently preferred embodiment, the sync window begins at such time that the center sample of the sync window is precisely one bit time away from the reference point sample. Thus, in the currently preferred embodiment, the measurement window expires one sample before the sync window begins. An example of the sync window of the present invention is shown in FIG. 8.

The polarity window consists of a time period wide enough to encompass one single lobe and is also centered precisely one bit time from the reference point. In the currently preferred embodiment, the polarity window has a width of five samples, such that the window comprises 2.5 microseconds. The polarity window is always centered within the sync window. An example of the polarity window is shown in FIG. 8.

The sync window and polarity window are used to determine if a confirming threshold break occurs approximately one bit time following the reference point. Prior to establishing packet synchronization, the receiver expects to receive data bits of the same binary state. (The collision resolution and bit synchronization portions of the preamble are transmitted with a transmit waveform of the same phase.) Thus, in order to establish packet synchronization, each confirming threshold break must be in the appropriate direction relative to the initial established polarity convention. For example, if a threshold break occurs during the sync window and is inside the polarity window, it is counted as a confirming threshold break only if the direction of the correlation matches the direction of the correlation which established the polarity convention. On the other hand, if the threshold break during the sync window occurs outside the polarity window, it is counted as a confirming threshold break only if the direction of correlation is opposite to the direction of the correlation which established the polarity convention. If there is a threshold break during the sync window which is not in the appropriate direction, it is ignored. Thus, in the currently preferred embodiment, a confirming threshold break is defined to be a correlation for which all of the following conditions are true: 1) the correlation exceeds the threshold; 2) the correlation occurs during the sync window; 3) the correlation is in the appropriate direction relative to the polarity convention established; and 4) the correlation occurs prior to establishing packet synchronization. If no confirming threshold break occurs during the sync window, the new reference point becomes the middle sample of the sync window. If at least one confirming threshold break does occur during the sync window, the new reference point is the sample during the sync window with the largest correlation absolute value.

If packet synchronization is not yet established after the first sync window, a new measurement window is set up following the sync window. The packet synchronization process continues searching for a larger correlation than that of the previous reference point. If a threshold break whose correlation absolute value is greater than that of the previous reference point occurs within the measurement window, then the measurement window is restarted, the sample of this threshold break becomes the new reference point, the next sync window is centered one bit time from the new reference point, and the number of confirming threshold breaks is reset to zero. If no threshold break which exceeds the correlation value of the previous reference point occurs in the second measurement window, then another sync window is searched for a confirming threshold break.

This process of setting up a measurement window to search for a threshold break with a larger correlation and then setting up a sync window and a polarity window to look for a confirming threshold break continues until packet synchronization is established. The definition of what is required for packet synchronization is configurable by the cell. After an initial threshold break, transceiver 100 can be configured to require a threshold break in one sync window or in a predetermined number of sync windows before transceiver 100 is considered to have established packet synchronization. Moreover, the sync windows required for synchronization need not be consecutive, such that two threshold breaks may be required, but they can be in any combination of non-consecutive sync windows, since the correlation triplet of any bit may be distorted and not break threshold. Once transceiver 100 establishes packet sync, the measurement windows are no longer required.

In the currently preferred embodiment, carrier is considered lost (and the quiet state is entered) if prior to establishing packet sync, no threshold breaks occur during 24 consecutive sync windows. After the establishment of packet synchronization, carrier is considered lost if no threshold breaks occur in 8 consecutive sync or polarity windows corresponding to a complete data byte. Whether sync or polarity windows are examined for threshold breaks for the purpose of determining carrier lost is configurable. Transceiver 100 may be configured through cell interface 101 to use either the polarity or sync windows for this purpose. It should be noted that in the currently preferred embodiment once packet sync has been attained threshold breaks which occur outside sync and polarity windows are ignored, except for their use as false carrier detect indications within the adaptive threshold process. Refer to copending application, Ser. No. 07/942,646, filed on Sep. 9, 1992, entitled "Adaptive Threshold in a Spread Spectrum Communications System" for details on the adaptive threshold process, now U.S. Pat. No. 5,263,050. Once carrier is lost, the measurement, sync, and polarity windows are no longer generated (until the next threshold break).

4. MAINTAINING SYNCHRONIZATION

Before and after establishing packet synchronization, the present invention allows for the sync and polarity windows to be shifted in time (i.e., adjusted to other than exactly 100 μs from their previous occurrences) in order to maintain bit synchronization. The sync and polarity windows are shifted such that the centers of the next windows occur precisely one bit time (100 μs) from the previous reference point. Before packet synchronization is established, the reference point associated with a sync window is defined as the sample in the sync window corresponding to a threshold break with the largest correlation absolute value and with the appropriate direction (as defined by the polarity convention discussed previously) or the middle sample of the sync window if no threshold breaks occur within the sync window.

After packet sync is established, the reference point is independent of the correlation direction, and is defined by the sample in the sync window corresponding to a threshold break with the largest correlation absolute value or the middle sample of the sync window if no threshold breaks occur within the sync window.

In the currently preferred embodiment, the sync window is 13 samples wide. Therefore, depending on location of the reference point within the current sync window, the next sync window can be shifted to be one data bit time later plus or minus six samples so that the next sync window and polarity window are centered one data bit time from the current reference point. In the currently preferred embodiment, if no threshold breaks occur within the sync window, no adjustment is made to the relative location of the sync and polarity windows, and thus they are located one data bit time later. Thus, the present invention provides the capability of shifting both the sync and polarity windows to insure that they are always centered one data bit time from the last reference point.

5. DATA DECODING

Data is decoded based on the direction of the correlation during the reference point sample, and on the polarity convention. To reiterate, after packet sync is established, the reference point is the sample within the sync window that had the largest correlation value to break threshold or the middle sample of the sync window if there was no threshold break. The direction of the correlation is indicated by the correlation sign bit from the output of the receive correlator.

The polarity convention is utilized during packet synchronization and changes throughout the packet depending on whether the reference point occurs within the polarity window. In the currently preferred embodiment, the polarity convention is effectuated as a polarity signal.

The polarity signal allows data to be decoded correctly if none, either, or both of the following are true: 1) a side lobe of any correlation triplet is larger than a center lobe; 2) there is an inversion in the signal path between the transmitter and the receiver. The polarity signal is initialized depending on the direction of the threshold break which either started the first measurement window or caused any measurement window to be restarted. For example, if the threshold break which restarted the measurement window is an upward correlation, the polarity signal is reset to zero. In this case, either of the following may be true: 1) the threshold break is due to a center lobe and there is no inversion in the signal path between transmitter and receiver; or 2) the threshold break is due to a side lobe and there is an inversion in the signal path. Similarly, if the threshold break which restarted the measurement window is a downward correlation, the polarity signal is set to one. In this case, either the following is true: 1) the threshold break is due to a side lobe and there is no inversion in the signal path; or 2) the threshold break is due to a center lobe and there is an inversion in the signal path.

In the currently preferred embodiment, the location of the reference point within the sync window is capable of toggling the polarity convention. When the reference point occurs outside the polarity window, the next sync window will be centered around a side lobe if it is currently centered around the center lobe, and vice versa. In this case, the polarity convention is changed by toggling the polarity signal. Referring to FIG. 8, where reference point 810 occurs outside the polarity window, which causes the polarity signal to be toggled at 811. When the data is decoded for that bit, both the direction of the correlation during the reference point and the new polarity convention is used.

In the present invention, when the polarity signal toggles to a zero, the resulting decoded data is a 1 for an upward correlation (and 0 for a downward correlation) during the reference point. When the polarity toggles to a 1, then the resulting decoded data is a 0 for an upward correlation (and 1 for a downward correlation). Thus, referring to FIG. 8, the decoded data bit associated with reference point 810 is a 1, due to a downward correlation and polarity signal toggling a 1.

By allowing the polarity to be toggled, the data in the packet may be decoded properly even though the reference point may be shifting from a center lobe to one of the side lobes or vice versa on a data bit-by-data bit basis.

The effect of the polarity signal is implemented by the parity decode block 110. The data decoder 111 outputs a stream of bits based on the direction of the correlation during the reference point only, This stream of bits is exclusive-ORed with the polarity signal (line 181 from bit timing generation block 115) by the parity decode block 110. The result of the operation is a stream of decoded data. Parity decode block 110 then performs weak bit detection and error correction on the stream of data, as discussed in co-pending application, Ser. No. 07/942,723, filed Sep. 9, 1992, entitled "Error Correction in a Spread Spectrum Transceiver". The output of the parity decode block 110 is then transferred to the cell via cell interface 101.

C. THE BIT TIMING GENERATION BLOCK

A block diagram of the currently preferred embodiment of bit timing generation block 400 is shown in FIG. 9. Referring to FIG. 9, bit timing generation block 400 comprises the following component blocks: control block 401, peak detection block 402, 2-bit counter 403, 2-bit counter decoder 404, 8-bit counter load value 405, 8-bit down counter 406 and windows generation block 407. In the currently preferred embodiment, each of the component blocks is implemented using random logic.

Control block 401 is coupled to a CNT_TC signal via line 415 from 2-bit counter decoder 404, a SET_SW signal via line 416 from windows block 407, an RX_TC signal via line 417 from windows block 407, a sign bit CORRSGN via line 418 from the receive correlator (FIG. 3), the CAR_LOST signal via line 419 from the carrier lost detection block (FIG. 3), a RXCLK signal on line 420 from the clock generator (FIG. 3), a JAM signal via line 422 from peak detection block 402, a SET_CDINSW signal via line 423 from peak detection block 402 and a TOG_POL signal via line 424 from peak detection block 402. In response to the input signal, control block 401 generates a SYNCD signal on line 414, a SET_SYNCD signal on line 413, a CDINSW signal on line 412 a 2B_CE signal on line 410 and a POL signal on line 411 as outputs.

Two-bit counter 403 is coupled to a 2B_CE signal via line 410 output from control block 401, the CAR_LOST signal via line 419 at its RST input, the JAM signal via line 422 at its parallel enable (PE) input from peak detection block 402, and the RXCLK via line 420. In response to the input signals, two-bit counter 403 generates a Q0 and Q1 output signals on lines 425 and 426 respectively.

Two-bit counter decoder 404 is coupled to the Q0 and Q1 outputs of two-bit counter 403 via lines 425 and 426 respectively and is coupled to the SYNCDCNT signal via line 421. In response to the input signals, 2-bit counter decoder generates a CNT_TC signal on line 415 and a CNT_RST signal on line 422.

Peak detection block 402 is coupled to the SYNCD signal output from control block 401 via line 414, the POL signal output from control block 401 via line 411, the CORRSGN signal via line 418, the 8-bit lines output from 8-bit down counter 406 via lines 428, the absolute value bus CORRABS[0..6] via lines 429 from the receive correlator (FIG. 3), the carrier detection signal CD via line 430 from the carrier detection block 116, the RXCLK via line 420, the SET_SW signal output from windows block 407 via line 416, the RX_TC signal from windows block 407 via line 417, the sync window signal SW output from windows block 407 via line 431, the measurement window signal MW output from windows block 407 via line 432, the SET_MW1 signal output, from windows block 407 via line 433, the polarity window signal PW output from windows block 407 via line 434, the MID_SW signal output from windows block 407 via line 435, the CDINSW signal output from control block 401 via line 412, and the CAR_LOST signal via line 419. In response to the inputs signals, peak detection block generates a SET_CDINSW signal on line 423, a DECSGN signal on line 441, a DECABS[0..6] bus on lines 440, the TOG_POL signal on line 424, the JAM signal on line 422, the 8B_CE signal on line 439, and the 8B_PE on line 438.

Eight-bit counter load value 405 is coupled to the JAM signal output from peak detection block 402 via line 422 and the 8B_CE signal output from peak detection block 402 via line 439. In response to the input signals, eight-bit load 405 generates the 8BD[0..7] bus signals on lines 442.

Eight-bit down counter 406 is coupled to the eight bit counter value 8BD[0..7] output from eight-bit counter load value 405 via lines 442, the 8B_CE signal output from peak detection block 402 via line 439 and the 8B_PE signal output from peak detection block 402 via line 438. In response to the input signals, eight-bit down counter 406 generates the 8BQ[0..7] bus signals on lines 428.

Windows block 407 is coupled to the JAM signal output from peak detection block 402 via line 422, the SYNCD signal output from control block 401 via line 414, the SET_SYNCD signal output from control block 401 via line 413, the CNT_RST signal output from 2-bit counter decoder 404 via line 422, the CD signal via line 430, the 8-bit counter bus 8BQ[0..7] output from eight-bit down counter 406 via lines 428, and the RXCLK signal via line 420. In response, windows block 407 generates the SET_SW signal on line 416, the RX_TC signal on line 417, the SW signal on line 431, the MW signal on line 432, the SET_MW1 signal on line 433, the PW signal on line 434, and the MID_SW signal on line 435.

1. THE CONTROL BLOCK

Control block 401 receives a CNT_TC signal on line 415 from counter decoder 404, a SET_SW signal on line 416 from windows block 407, an RX_TC signal on line 417 from windows block 407, a sign bit CORRSGN on line 418 from the receive correlator (FIG. 3), the CAR_LOST signal on line 419 from the carder loss detection block (FIG. 3) indicating that the carrier is lost, a RXCLK signal on line 420 from the clock generator (FIG. 3), a JAM signal on line 422 from peak detection block 402, a SET_CDINSW signal on line 423 from peak detection block 402 and a TOG_POL signal on line 424 from peak detection block 402. In response to the inputs signal, control block 401 generates control signals.

Control block generates the following control signals: the signal POL on line 411, the signal CDINSW on line 412, the signal 2B_CE on line 410, and the signal SYNCD on line 414, and the signal SET_SYNCD on line 413. FIG. 10 illustrates the currently preferred embodiment of control block 401 of the present invention.

Referring to FIG. 10, the inputs of AND gate 911 are coupled to the JAM signal and the CORRSGN signal. AND gate 911 outputs a signal SET_POL which is coupled to the set input S of flip-flop 904. The inputs of AND gate 912 are coupled to the JAM signal and the inverted CORRSGN signal. In response to its inputs, AND gate 912 outputs a signal RST_POL which is coupled to the reset input R of flip-flop 904. Flip-flip 904 is also coupled to receive the TOG_POL signal. Flip-flop 904 is clocked by the RXCLK coupled to its clock input.

The inputs of OR gate 901 are coupled to the SET_SW signal and the CAR_LOST signal. The output of OR gate 901 is coupled to the reset input R of flip-flop 902. The set input S of flip-flop 902 is coupled to the SET_CDINSW signal. Flip-flop is clocked by RXCLK coupled to its clock input. The output of flip-flip 902 is the CDINSW signal. The output of flip-flop 905 is also coupled to one of the inputs of AND gate 905. The other input of AND gate 905 is coupled to the RX_TC signal. The output of AND gate 905 is the 2B_CE signal.

The inputs of AND gate 906 are coupled to the 2B_CE signal output from AND gate 905 and the signal CNT_TC. The output of AND gate 906 is coupled to the set input S of flip-flop 903. The reset input R of flip-flop 903 is coupled to the CAR_LOST signal. Flip-flop 903 is clocked by the RXCLK signal coupled to its clock input. The output of flip-flop 903 is the SYNCD signal. The output of flip-flop 903 is also coupled to an inverted input of AND gate 907. The other input of AND gate 907 is coupled to the output of AND gate 906. The output of AND gate 907 is the SET_SYNCD signal.

The polarity signal POL is the output of flip-flop 904 which has set, reset, and toggle inputs, and is clocked by signal RXCLK. When the JAM signal is high, the polarity signal POL is set or reset depending on the state of the sign bit CORRSGN, which indicates the direction of the correlation.

The signal JAM is generated by the peak detection block 402 and is high when the first threshold break occurs or when a threshold break with a correlation absolute value greater than that of the previous reference point occurs during the measurement window. When the JAM signal is high and the signal CORRSGN is high, indicating a downward correlation, the signal POL is set high by the output of AND gate 911. When the JAM signal is high and the CORRSGN signal is low, indicating an upward correlation, the signal POL is reset low by the output of AND gate 912. The set or reset of flip-flop 904 initializes the polarity convention. Throughout the remainder of the packet, the signal POL may be toggled each bit time by the signal TOG_POL, which is generated by the peak detection block 402, and is discussed later.

The CDINSW signal is the output of SR flip-flop 902 and indicates that a carrier detection occurred within the sync window (and, if packet sync has not been established, that the direction of the correlation is in the appropriate direction relative to the previously established polarity convention). The signal CDINSW is reset by the signal SET_SW, which is high the sample prior to the beginning of the sync window. The CDINSW signal is set by the SET_CDINSW signal, which is generated by peak detection block 402, and is discussed below. The signal CDINSW is also reset when carrier is lost at the end of a packet, as indicated by the signal CAR_LOST being high, so that the signal CDINSW is reset prior to the start of the next packet.

The 2B_CE signal enables two-bit counter 403 to increment. The 2B_CE signal is generated by AND gate 905, whose inputs are the signal CDINSW and the signal RX_TC. The signal RX_TC is high for one sample immediately following the sync window. Thus, if the signal CDINSW is set during a sync window, which indicates, during the packet synchronization process, that a confirming threshold break was detected, two bit counter 403 is incremented once during the sample in which the signal RX_TC is high.

The SYNCD signal is the output of RS flip-flop 903 and is high when packet synchronization has been established. The signal SYNCD is set by the output of AND gate 906, which has as its inputs the signal 2B_CE and the signal CNT_TC, from 2-bit counter decoder block 404. The signal CNT_TC is high when one fewer than the required number of confirming threshold breaks has been counted during the packet synchronization process. Thus, when the signal CNT_TC is high, and 2B_CE goes high indicating a confirming threshold break is detected, then the output of AND gate 906 goes high and sets the signal SYNCD high, indicating that packet synchronization has been established. The signal SYNCD is reset by the signal CAR_LOST, which is high when carrier is lost at the end of a packet.

Control block 401 also generates the signal SET_SYNCD, which is high for one sample when packet synchronization is established. The signal SET_SYNCD is the output of AND gate 907, which has its inputs the output of AND gate 906, which is high when the signal SYNCD is being set high, and the inverse of the signal SYNOD. Thus, the signal SET_SYNOD is high for one sample when the signal SYNOD is set from low to high.

2. THE TWO-BIT COUNTER BLOCK

Two-bit counter 403 is used to record the state of the packet synchronization process. Two-bit counter 403 is loaded with a value of 1 when the signal JAM is high (i.e., when the first threshold break occurs or when a threshold break with a larger correlation absolute value than that of the previous reference point occurs during the measurement window). The signal JAM is coupled to the parallel-enable (PE) input of the counter. Two-bit counter 403 is incremented when the signal 2B_CE is high, which indicates that a confirming threshold break is detected. The signal 2B_CE is coupled to the count-enable (CE) input of the counter. Two-bit counter 403 is reset when carrier lost is detected at the end of a packet. The signal CAR_LOST is coupled to the reset (RST) input of the counter. The outputs of two-bit counter 403 are the signals Q0 and Q1 on lines 425 and 426, respectively. Q0 and Q1 represent the current state of the counter.

3. THE TWO-BIT COUNTER DECODER BLOCK

Two-bit counter decoder 404 receives the Q0 and Q1 outputs of the two-bit counter 403 on lines 425 and 426, respectively, and receives the SYNCDCNT signal on line 421. The SYNCDCNT signal is a configuration bit form the cell and determines how many confirming threshold breaks are required to establish packet synchronization. In the currently preferred embodiment, when the signal SYNCDCNT is zero, one confirming threshold break is required. When the signal SYNCDCNT is one, two confirming threshold breaks are required. Two-bit counter decoder block 404 generates the signal CNT_TC on line 415 and the signal CNT_RST on line 422. The signal CNT_TC indicates that one fewer than the required number of confirming threshold breaks has been detected. Thus, if the signal SYNCDCNT is a zero, the signal CNT_TC is high when the Q0 and Q1 outputs of two-bit counter 403 indicate a count of 1. And, if the signal SYNCDCNT is a one, the signal CNT_TC is high when the Q0 and Q1 outputs of two-bit counter 403 indicate a count of 2. The signal CNT_RST is high when the Q0 and Q1 outputs of two-bit counter 403 indicate a count of zero, which means that the packet synchronization process has not begun since the last packet ended.

4. THE PEAK DETECTION BLOCK

Peak detection block 402 determines the reference point within each sync window. Based on the reference point, peak detection block 402 adjusts the bit timing for the next data bit time, records the direction of the correlation for data decoding, and records the absolute value of the correlation for weak bit detection. For information on weak bit detection, see co-pending application, Ser. No. 07/942,723, filed Sep., 9, 1992, entitled "Error Correction in a Spread :, Spectrum Transceiver". Peak detection block 402 also generates control signals which are used by other blocks within the bit timing generation block 400.

In the currently preferred embodiment, (referring to FIG. 11) the reference point and the corresponding absolute value of the correlation for weak bit detection are determined using 7-bit register 1101, 7-bit greater-than comparator 1102, AND gates 1103–1107, OR gates 1108–1109, 1124 and XOR gates 1125–1126. The signal SET_SW is high the sample prior to the beginning of the sync window and causes 7-bit register 1101 to be reset. Seven-bit register 1101 is loaded with the current absolute value of the correlation when the signal NEW_REF, which is the output of OR gate 1109, is high. The output of OR gate 1109 is coupled to the parallel-enable (PE) input of 7-bit register 1101, and the correlation absolute value bus CORRABS[0..6] is coupled to the D[0..6] inputs of 7-bit register 1101. The signal NEW_REF is high when a new reference point is determined. Thus, 7-bit register 1101 stores the absolute value of the correlation associated with the current reference point. The output of 7-bit register 1101 is the bus DECABS[0..6] on lines 1130 which is used by the weak bit detection block 112.

The signal NEW_REF is high, and thus a new correlation absolute value is loaded into 7-bit register 1101, when any of the following conditions is true:

Condition 1)

The first threshold break occurs, which is indicated by the signal SET_MW1, an input to OR gate 1108, being high.

Condition 2)

A threshold break occurs during the measurement window which has a correlation absolute value greater than that of the previous reference point. This condition is indicated by the output of AND gate 1107 being high, which has as its inputs the signal MW and the signal PK_CD. The signal MW is high during the measurement window. The signal PK_CD is the output of AND gate 1104 which has the signal CD and the signal GT coupled to its inputs. The signal CD is high when there is a threshold break (i.e., a carrier detection). The signal GT is the output of 7-bit greater-than comparator block 1102, which has as its A bus input the correlation absolute value bus CORRABS[0..6] and as its B bus input the output of 7-bit register 1101. The signal GT is high when the A bus is greater than the B bus. If either Condition 1 or Condition 2 is met, the signal JAM (output of OR gate 1108) is high.

Condition 3)

A threshold break occurs during the sync window which has a correlation absolute value greater than that of the previous reference point, and, if packet sync has not yet been established, the direction of the correlation is consistent with the established polarity convention. This condition is indicated by the signal SET_CDINSW (the output of AND gate 1106) being high, which has as its inputs the signal PK_CD and the output of AND gate 1105. As discussed above, the signal PK_CD is high when a threshold break occurs with a correlation absolute value greater than that of the previous reference point. AND gate 1105 has as its inputs the signal SW and the output of OR gate 1124. The signal SW is high during the sync window. The inputs of OR gate 1124 are coupled to the signal SYNCD and the output of XOR gate 1125. The signal SYNCD is high if packet synchronization has been established, and therefore satisfies part of Condition 3. If SYNCD is low, the output of XOR gate 1125 must be high to satisfy part of Condition 3. The output of XOR gate 1125 is high if the direction of the current correlation is consistent with the polarity convention. The polarity convention is indicated by the signal POL, which is coupled as an input to XOR gate 1125. If the signal POL is low, a confirming threshold break is counted only if an upward correlation occurs during the polarity window or if a downward correlation occurs outside the polarity window. An upward correlation is indicated by the signal CORRSGN being low (and a downward correlation by the signal CORRSGN being high), and the signal PW is high during the polarity window, so in either of the above two cases, the output of XOR gate 1126 is high. Since the signal POL is low, the output of XOR gate 1125 is then high. If the signal POL is high, a confirming threshold break is counted only if a downward correlation occurs during the polarity window or if an upward correlation occurs outside the polarity window. In either case, the output of XOR gate 1126 is low. Since the signal POL is high, the output of XOR gate 1125 is then high.

Condition 4)

The middle sample of the sync window is active and no confirming threshold break has occurred yet during the sync window. This condition is indicated by the output of AND gate 1103 being high, which has the signal MID_SW and the inverse of the signal CDINSW coupled as its inputs. The signal MID_SW is generated from windows block 407 and is high during the middle sample of the sync window. The signal CDINSW is generated from control block 401 and is low if no confirming threshold break has occurrence yet in the sync window.

When the signal NEW_REF is high, one-bit register 1123 is loaded with the direction of the correlation during the new reference point. The signal NEW_REF is coupled to the parallel-enable (PE) input of one-bit register 1123 and the signal CORRSGN is coupled to the D input. The output of one-bit register 1123 is the signal DECSGN which is used by data decoder block 111.

Peak detection block 402 controls the adjustment of the bit timing based on the location of the reference point. This is accomplished using 4-bit counter 1120, 4-bit counter load value block 1119, AND gate 1122, and OR gates 1110 and 1114, in conjunction with 8-bit counter 406 and 8-bit down counter load value block 405. When the signal NEW_REF is high, 4-bit counter 1120 is loaded with the value on the outputs of 4-bit counter load value block 1119. Four-bit counter load value block 1119 is coupled to receive as its inputs the signal JAM and the outputs 8BQ[0..7] of 8-bit counter 406. Four-bit counter lead value block 1119 generates output signals 4BD[0..3] which are coupled to the D[0..3] inputs of 4-bit counter 1120.

When the signal JAM is high, 4-bit counter load value block 1119 generates a value of 8 on 4BD[0..3]. When the signal JAM is low, 4-bit counter load value block 1119 passes the four least significant bits of 8BQ[0..7] to 4BD[0..3]. The signal NEW_REF is coupled to the parallel-enable (PE) input of 4-bit counter 1120, so that when a new reference point is determined, the value of a 4BD[0..3] is loaded.

The count-enable (CE) input of 4-bit counter 1120 is coupled to the output of AND gate 1122. AND gate 1122 has as its inputs the inverse of the signal SW and the inverse of the signal 4B_TC. The signal SW is high during the sync window. The signal 4B_TC is high when 4-bit counter 1120 is at its terminal count of 15. Thus, 4-bit counter 1120 is enabled to count when both the signal SW is low and when 4-bit counter 1120 has not yet reached a count of 15.

Referring to FIG. 12A, as an example, when the signal JAM is high, which causes the signal NEW_REF to also be high, 4-bit counter 1120 is loaded with the value of 8. Following the signal JAM being high, the signal SW is net high for approximately one bit time. Thus, 4-bit counter 1120 is enabled to count, and the signal 4B__TC goes high 7 samples following the signal JAM being high.

Referring to FIG. 12B, if the signal NEW_REF goes high during a sync window, 4-bit counter 1120 is loaded with the 4 least significant bits of the 8-bit counter value, 8BQ[0..7]. During the sync window, which is 13 samples wide in the currently preferred embodiment, 8BQ[0..7] takes on values 13 down to 1, sequentially. Thus, if the reference point occurs one sample prior to the middle sample of the sync window, 4-bit counter 1120 is loaded with a value 9. Then, since 4-bit counter 1120 is enabled to count when the signal SW is low (and the signal 4B_TC is low), the signal 4B_TC goes high 6 samples after the end of the sync window.

The signal 4B_TC is used to generate the signal 8B_CE, which is coupled to the count-enable (CE) input of 8-bit down counter 406. The signal 8B_CE; the output of OR gate 1114, is high when either SW is high or the signal 4B_TC is high. The signal 8B_PE, output of OR gate 1110, is high when either the signal JAM is high or the signal RX_TC is high. The operation of 8-bit down counter 406 is discussed below.

Peak detection block 402 also generates the signal TOG_POL, which is coupled to the control block 401 and used to toggle the polarity signal POL. The signal TOG_POL is the output of the AND gate 1111, which has the signal RX_TC and the signal EN_TOG coupled to its inputs. The signal RX_TC is high for one sample following the end of the sync window. The signal EN_TOG is the output of the SR flip-flop 1112. The signal EN_TOG is reset by the output of OR gate 1118. One input of OR gate 1118 causes EN_TOG to be reset When the signal SET_SW is high, the sample before the beginning of the sync window. The signal EN_TOG is then set or reset during the sync window when the signal SET_CDINSW (discussed previously) is high, depending on whether the new reference point is inside or outside of the polarity window (PW). If the new reference point is inside the polarity window (the signal PW is high), the output of AND gate 1117 is high and the signal EN_TOG is reset. If the new reference point is outside the polarity window (PW is low), the output of AND gate 1116 is high and the signal EN_TOG is set. Thus, the signal TOG_POL is high during the sample following the sync window only if the reference point is located outside the sync window. The signal EN_TOG is also reset by the signal CAR_LOST when carrier is lost at the end of a packet.

5. THE 8-BIT COUNTER LOAD VALUE BLOCK

Eight-bit counter load value block 405 receives as inputs the signal JAM on line 422 and the signal 8B_CE on line 439 and generates the 8-bit output 8BD[0..7] on lines 442. When the signal JAM is high, the 8-bit output 8BD[0..7] is 199 (decimal). When the signal JAM is low, the value of 8BD[0..7] depends on the state of the signal 8B_CE. If the signal 8B_CE is high, the value on 8BD[0..7] is 199 (decimal). If the signal 8B_CE is low (and JAM is low), the value on 8BD[0..7] is 192 (decimal). The 8BD[0..7] output is coupled to the D[0..7] inputs of 8-bit down counter 406, which is discussed below.

6. THE 8-BIT COUNTER BLOCK

Eight-bit down counter 406 is used to count the appropriate number of samples in each bit time. In the currently preferred embodiment, each bit time contains, on average, 200 samples. When receiving a packet, the number of samples per bit time can be adjusted above or below 200 samples, depending on the location of the reference point. In the currently preferred embodiment, the number of samples can be adjusted up to 6 samples above or below the nominal 200 samples per bit time.

Eight-bit down counter 406 receives the following inputs: the signal 8B_PE on line 438 from peak detection block 402 to its parallel-enable (PE) input, the signals 8BD[0..7] on lines 442 from 8-bit counter load value block 405 to its D[0..7] inputs, the signal 8B_CE on line 439 from peak detection block 402 to its counter-enable (CE) input, and the clock RXCLK on line 420 to its clock (CLK) input. Eight-bit down counter 406 outputs it counter value on 8BQ[0..7] on lines 428.

When the transceiver is not currently receiving a packet, the signal 8B_CE is high because 4-bit counter 1120 of peak detection block 402 is at its terminal count. In this case, the value on 8BD[0..7] is 199 (decimal). When the transceiver is not currently receiving a packet, the signal 8B_PE is high only when the signal RX_TC is high. The signal RX_TC is high when 8-bit down counter 406 is at a count of zero. Thus, when not receiving a packet, 8-bit down counter 406 counts down from 199 to 0, at which time it is re-loaded with 199, giving 200 samples per bit time.

When the signal JAM is high during packet synchronization, the signal 8B_PE is high and the value on 8BD[0..7] is 199 (decimal). Thus, 8-bit down counter 406 is loaded with 199. However, as shown in FIG. 12A, the signal 8B_CE does not go active until 7 samples after the sample in which the signal JAM is high. Thus, 8-bit down counter 406 begins counting down from 199 seven samples after the sample in which the signal JAM is high. This results in the middle sample of the next sync window (which is high when 8-bit counter 406 has a count of 7) occurring exactly 200 samples after the sample in which the signal JAM is high.

When the signal RX_TC goes high following a sync window, the signal 8B_PE is high and the signal 8B_CE is low. In this case, the 8-bit down counter 406 is loaded with the value 192 (decimal). Referring to FIG. 12B, the 8-bit down counter is enabled to begin counting down from 192 when 4-bit counter 1120 of peak detection block 402 reaches it terminal count (the signal 4B_TC is high). Thus, in the example of FIG. 12B, if the reference point occurred in the fifth sample of the sync window, 8-bit down counter 406 starts counting down from 192 five samples following the sample in which RX_TC was high. This results in the next bit time being 198 samples long, and the middle sample of the next sync window occurring 200 samples from the reference point.

7. THE WINDOWS BLOCK

Windows block 407 receives the JAM signal from peak detection block 402 on line 422, the SYNCD signal from control block 401 on line 414, the SET_SYNCD signal from control block 401 on line 413, the CNT_RST signal from 2-bit counter decoder 404, the CD signal on line 430, the 8BQ[0..7] output from eight-bit down counter 406 on lines 428, and the RXCLK signal on line 420. In response, windows block 407 generates the SET_SW signal on line 416, the RX_TC signal on line 417, the SW signal on line 431, the MW signal on line 432, the SET_MW1 signal on line 433, the PW signal on line 434, and the MID_SW signal on line 435.

Windows block 407 generates the various windows (i.e., time periods) for bit timing generation. The logic of windows block 407 decodes the value on 8BQ[0..7] on lines 428 from eight-bit counter 406 to determine when to generate the windows.

The measurement window (MW), the sync window (SW) the polarity window (PW), the signal SET_SW and the signal MID_SW are only generated when receiving a packet. In other words, the MW, SW and PW, SET_SW, and MID_SW signals are generated after the first correlation which breaks threshold and until carrier is lost. In the currently preferred embodiment, this condition is indicated by the signal CNT_RST being low and the signal SYNCD being high.

FIG. 13 depicts the timing for the various windows and signals generated by windows block 407 for the currently preferred embodiment. The signal SET_SW is high when 8BQ[0..7] indicates a count of 14. The signal SW is high when 8BQ[0..7] indicates a count between 13 and 1 (inclusive). The signal PW is high when 8BQ[0..7] indicates a count between 9 and 5 (inclusive). The signal MID_SW is high when 8BQ[0..7] indicates a count of 7. The signal RX_TC is high when 8BD[0..7] indicates a count of 0. The signal MW is high for 96 μs after it is started or restated by the signal JAM being high and ends when 8BQ[0..7] indicates a count of 15. In addition, until packet synchronization is established, the signal MW is high following the signal RX_TC at sample 0 and until sample 15. Windows block 407 also generates the signal SET_MW1, which is high for one sample, when the first threshold break of a packet occurs, as indicated by the signal CD being high, the signal CNT_RST being high, and the signal SYNCD being low.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, reference to the details of the preferred embodiments are not intended to limit the scope of the claims which themselves recite only those features regarded as essential to the invention.

Thus, a method and means for data recovery in a spread spectrum communications systems has been described.

We claim:

1. A method for recovering data in a spread spectrum communications system, said method comprising the steps of:
   receiving a communications signal containing a plurality of data bits, wherein each of the plurality of data bits includes multiple lobes;
   attaining bit synchronization on the communications signal;
   determining bit timing between the plurality of data bits;
   identifying one of the plurality of lobes for each of the plurality of data bits as producing a peak correlation value during a time period; and
   decoding data according to the location of the peak correlation in the time period.

2. The method defined in claim 1 wherein the step of attaining bit synchronization comprises locating at least one peak correlation having an absolute value greater than a predetermined threshold.

3. The method defined in claim 1 wherein the step of attaining bit synchronization comprises locating at least one peak correlation having an absolute value greater than a predetermined threshold, such that bit synchronization occurs after only one bit is received.

4. The method defined in claim 1 further comprising the step of establishing packet synchronization.

5. The method defined in claim 1 further comprising the step of maintaining bit synchronization.

6. The method defined in claim 5 wherein the step of maintaining bit synchronization comprises the steps of shifting the time period, such that the center of the time period occurs one bit time from the previous decoded data.

7. The method defined in claim 1 wherein each of the plurality of data bits includes a center lobe and a pair of side lobes straddling the center lobe, such that a correlation triplet is formed for each of the plurality of data bits.

8. The method defined in claim 1 wherein the step of receiving includes receiving at least one of the plurality of data bits being distorted, such that said at least one of the plurality of data bits includes only two lobes.

9. The method defined in claim 1 further comprising the steps of:
   generating an absolute value representing the correlation peak;
   generating a sign indication representing the direction of the correlation peak; and
   decoding data according to the sign indication and the location of the peak correlation with respect to time.

10. The method defined in claim 9 wherein the absolute value and sign indication are generated by correlating the received signal representing a waveform of a received data bit with a representation of an expected received waveform.

11. A method for recovering data in a spread spectrum communications system, said method comprising the steps of:
    receiving a communications signal containing a plurality of data bits, wherein each of the plurality of data bits includes a center lobe and a pair of side lobes straddling the center lobe, such that a correlation triplet is formed for each of the plurality of data bits;
    attaining bit synchronization on the communications signal;
    determining bit timing between the plurality of data bits;
    identifying one of the plurality of lobes for each of the plurality of data bits as producing a peak correlation value during a time period;
    generating an absolute value for the correlation peak;
    generating a sign indication representing the direction of the correlation peak; and
    decoding data according to the sign indication and the location of the peak correlation in the time period.

12. The method defined in claim 11 wherein the step of attaining bit synchronization comprises locating at least one peak correlation having an absolute value greater than a predetermined threshold.

13. The method defined in claim 11 wherein the step of attaining bit synchronization comprises locating at least one peak correlation having an absolute value greater than a predetermined threshold, such that bit synchronization occurs after only one bit is received.

14. The method defined in claim 11 further comprising the step of establishing packet synchronization.

15. The method defined in claim 11 further comprising the step of maintaining bit synchronization.

16. The method defined in claim 15 wherein the step of maintaining bit synchronization comprises the steps of shifting the time period, such that the center of the time period occurs one bit time from the previous decoded data.

17. The method defined in claim 11 wherein the step of receiving includes receiving at least one of the plurality of data bits being distorted, such that said at least one of the plurality of data bits includes only two lobes.

18. The method defined in claim 11 wherein the absolute value and sign indication are generated by correlating the received signal representing a waveform of a received data bit with a representation of an expected received waveform.

19. The method defined in claim 11 including the step of detecting carrier loss.

20. The method defined in claim 19 wherein the step of detecting carrier loss comprises the step of determining when a number of time intervals in which no correlation peaks over a predetermined threshold have occurred.

21. A transceiver for transmitting and receiving digital information across various communications media comprising:
    transmitter means for generating a spread spectrum signal for transmission to another transceiver; and
    receiver means for recovering data from a spread spectrum signal, said receiver means including
    means for receiving a communications signal containing a plurality of data bits, wherein each of the plurality of data bits includes multiple lobes;

means for attaining bit synchronization on the communications signal;

means for determining bit timing between the plurality of data bits;

means for identifying one of the plurality of lobes for each of the plurality of data bits as producing a peak correlation value during a time period; and means for decoding data according to the location of the peak correlation in the time period.

22. The transceiver defined in claim 21 wherein each of the plurality of data bits includes a center lobe and a pair of side lobes straddling the center lobe, such that a correlation triplet is formed for each of the plurality of data bits.

23. The transceiver defined in claim 21 further comprising:

means for generating an absolute value representing the correlation peak;

means for generating a sign indication representing the direction of the correlation peak; and means for decoding data according to the sign indication and the location of the peak correlation with respect to time.

24. A method of transmitting data on a communications channel to a receiver comprising the steps of:

generating a plurality of spread spectrum signals;

providing the signals to a communications channel;

receiving signals at the receiver from the communications channel, wherein the signals includes a plurality of data bits, wherein each of the plurality of data bits includes a center lobe and a pair of side lobes straddling the center lobe, such that a correlation triplet is formed for each of the plurality of data bits;

identifying one of the plurality of lobes for each of the plurality of data bits as producing a peak correlation value during a time period; and decoding data according to the location of the peak correlation in the time period.

25. The method defined in claim 24 further comprising the steps of:

determining which sample of the signals to decode using a correlation means and a first and second time period, wherein said first and second time periods are centered one bit time from the previously decoded data bit, and further wherein the second time period is shorter than the first time period;

decoding the signals according to whether the peak correlation within the first time period occurs within the second time period.

* * * * *

UNITED STATES PATENT AND TRADEMARK OFFICE
CERTIFICATE OF CORRECTION

PATENT NO. : 5,377,227
DATED : December 27, 1994
INVENTOR(S) : Hurlbut et al.

It is certified that error appears in the above-indentified patent and that said Letters Patent is hereby corrected as shown below:

In column 5 at line 34 delete "Carder" and insert --Carrier--

In column 5 at line 39 delete "carder" and insert --carrier--

In column 6 at line 15 delete "carder" and insert --carrier--

In column 10 at line 16 delete "convened" and insert --converted--

In column 10 at line 42 delete "carder" and insert --carrier--

In column 10 at line 43 delete "Carder" and insert --Carrier--

In column 10 at line 54 delete "carder" and insert --carrier--

In column 11 at line 30 delete "carder" and insert --carrier--

In column 12 at line 22 delete "arid" and insert --and--

In column 13 at line 28 delete "carder" and insert --carrier--

UNITED STATES PATENT AND TRADEMARK OFFICE
CERTIFICATE OF CORRECTION

PATENT NO. : 5,377,227
DATED : December 27, 1994
INVENTOR(S) : Hurlbut et al.

It is certified that error appears in the above-indentified patent and that said Letters Patent is hereby corrected as shown below:

In column 16 at line 37 delete "carder" and insert --carrier--

In column 23 at line 57 delete "occurrence" and insert --occurred--

In column 24 at line 10 delete "lead" and insert --load--

Signed and Sealed this

Twenty-first Day of October 1997

Attest:

BRUCE LEHMAN

*Attesting Officer*  *Commissioner of Patents and Trademarks*